(12) United States Patent
Kwon et al.

(10) Patent No.: US 10,277,913 B2
(45) Date of Patent: Apr. 30, 2019

(54) APPLICATION PROCESSOR FOR PERFORMING REAL TIME IN-LOOP FILTERING, METHOD THEREOF AND SYSTEM INCLUDING THE SAME

(71) Applicant: SAMSUNG ELECTRONICS CO., LTD., Suwon-si (KR)

(72) Inventors: Nyeong Kyu Kwon, Daejeon (KR); Hota Manjit, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 317 days.

(21) Appl. No.: 14/689,169

(22) Filed: Apr. 17, 2015

(65) Prior Publication Data

US 2016/0119635 A1 Apr. 28, 2016

(30) Foreign Application Priority Data

Oct. 22, 2014 (IN) .......................... 5269/CHE/2014
Feb. 24, 2015 (KR) ....................... 10-2015-0025676

(51) Int. Cl.
| | | |
|---|---|---|
| H04N 19/436 | (2014.01) |
| H04N 19/82 | (2014.01) |
| H04N 19/119 | (2014.01) |
| H04N 19/174 | (2014.01) |
| H04N 19/86 | (2014.01) |

(52) U.S. Cl.
CPC ......... *H04N 19/436* (2014.11); *H04N 19/119* (2014.11); *H04N 19/174* (2014.11); *H04N 19/82* (2014.11); *H04N 19/86* (2014.11)

(58) Field of Classification Search
CPC .................................................... H04N 19/436
USPC ......................................... 375/230.24, 240.24
See application file for complete search history.

(56) References Cited

U.S. PATENT DOCUMENTS

| | | | | |
|---|---|---|---|---|
| 6,055,270 | A * | 4/2000 | Ozkan ................ | H04N 21/2365 375/240.03 |
| 8,416,857 | B2 | 4/2013 | Au et al. | |
| 8,442,333 | B2 * | 5/2013 | Matsumoto .......... | H04N 19/176 382/234 |
| 8,483,279 | B2 | 7/2013 | Hiramatsu et al. | |
| 8,548,061 | B2 * | 10/2013 | Suzuki ................... | H04N 19/44 375/240.1 |
| 9,578,328 | B2 * | 2/2017 | Rapaka ................ | H04N 19/136 |
| 9,924,163 | B2 * | 3/2018 | Hishinuma ............ | H04N 19/86 |
| 2003/0185305 | A1 * | 10/2003 | MacInnis ............... | G06F 9/3861 375/240.25 |
| 2006/0233525 | A1 * | 10/2006 | Shibata .................. | H04N 19/70 386/329 |

(Continued)

FOREIGN PATENT DOCUMENTS

JP 2010-109572 A 5/2010

OTHER PUBLICATIONS

High efficiency video coding HEVC text specification draft 8, Rainer, Sullivan, Wiegand, 2012.*

*Primary Examiner* — William C Vaughn, Jr.
*Assistant Examiner* — Joseph Daniel A Towe
(74) *Attorney, Agent, or Firm* — Sughrue Mion, PLLC

(57) ABSTRACT

An application processor includes a first core configured to process a first picture including a first processing unit and a second processing unit and a second core configured to process a second picture including a third processing unit and a fourth processing unit, wherein the first core and the second core are configured to perform processing of the second processing unit and the third processing unit, respectively, in parallel.

21 Claims, 20 Drawing Sheets

(56) References Cited

U.S. PATENT DOCUMENTS

| | | | |
|---|---|---|---|
| 2009/0052555 A1* | 2/2009 | Mak-Fan | H04N 19/176 375/240.29 |
| 2010/0158125 A1* | 6/2010 | Park | H04N 19/436 375/240.16 |
| 2010/0169892 A1* | 7/2010 | Stam | G06F 9/5027 718/105 |
| 2010/0195922 A1 | 8/2010 | Amano et al. | |
| 2010/0246665 A1 | 9/2010 | Brederson et al. | |
| 2012/0099657 A1 | 4/2012 | Tanaka et al. | |
| 2012/0121018 A1* | 5/2012 | Kustka | H04N 19/436 375/240.16 |
| 2012/0140816 A1* | 6/2012 | Franche | H04N 19/172 375/240.03 |
| 2012/0230391 A1* | 9/2012 | Huang | H04N 19/436 375/240.02 |
| 2012/0263225 A1* | 10/2012 | Lee | H04N 19/436 375/240.2 |
| 2013/0028332 A1* | 1/2013 | Le Leannec | H04N 19/86 375/240.25 |
| 2013/0101216 A1 | 4/2013 | Cho et al. | |
| 2014/0003531 A1 | 1/2014 | Coban et al. | |
| 2014/0029671 A1* | 1/2014 | Hattori | H04N 19/43 375/240.16 |
| 2014/0132837 A1* | 5/2014 | Ye | H04N 19/423 348/525 |
| 2015/0103920 A1* | 4/2015 | Rapaka | H04N 19/70 375/240.26 |
| 2015/0139334 A1* | 5/2015 | Eregala | H04N 19/436 375/240.24 |
| 2015/0312569 A1* | 10/2015 | Araki | H04N 19/82 375/240.29 |
| 2016/0119635 A1* | 4/2016 | Kwon | H04N 19/436 375/240.24 |

* cited by examiner

APPLICATION PROCESSOR FOR PERFORMING REAL TIME IN-LOOP FILTERING, METHOD THEREOF AND SYSTEM INCLUDING THE SAME

CROSS-REFERENCE TO RELATED APPLICATION

This application claims priority under 35 U.S.C. § 119 to Indian Provisional Patent Application No. 5269/CHE/2014 filed on Oct. 22, 2014 in the Indian Patent Office and Korean Patent Application No. 10-2015-0025676 filed on Feb. 24, 2015 in the Korean Intellectual Property Office, the disclosure of which is incorporated by reference herein in its entirety.

BACKGROUND

1. Technical Field

Exemplary embodiments relate to a semiconductor device, and more particularly, to an application processor including multiple cores for performing real-time in-loop filtering, method thereof and a system including the same.

2. Description of the Related Art

A slice and a tile in a picture can reduce a dependency in entropy encoding or entropy decoding. However, when a plurality of slices or tiles in the picture are processed by a plurality of processors in parallel, a de-blocking operation of the plurality of slices or tiles may be stalled until the processing operation of macro-blocks adjacent to boundaries of the plurality slices or tiles is finished. In addition, the plurality of processors needs to exchange information on the de-blocking operation of the macro-blocks adjacent to boundaries of the plurality slices or tiles.

That is, when a plurality of divided regions in a picture are processed by a plurality of processors in parallel, the de-blocking operation may be stalled or delayed due to the dependencies and distributions of the plurality of divided regions in the picture processed by the plurality of processors.

SUMMARY

According to an aspect of an exemplary embodiment, there is provided an application processor including a first core configured to process a first picture including a first processing unit and a second processing unit, and a second core configured to process a second picture including a third processing unit and a fourth processing unit, wherein the first core and the second core are configured to perform processing of the second processing unit and the third processing unit, respectively, in parallel.

The first core may divide the first picture into the first processing unit and the second processing unit based on a processing complexity of the first picture, the second core may divide the second picture into the third processing unit and the fourth processing unit based on a processing complexity of the second picture, and when a number of slices in the second processing unit are different from a number of slices in the third processing unit, the first core completes the processing of the second processing unit in a first time period and the second core completes the processing of the third processing unit in the first time period.

The first core may divide the first picture into the first processing unit and the second processing unit based on a processing complexity of the first picture, the second core may divide the second picture into the third processing unit and the fourth processing unit based on a processing complexity of the second picture, and when a number of tiles in the second processing unit are different from a number of tiles in the third processing unit, the first core completes the processing of the second processing unit in a first time period and the second core completes the processing of the third processing unit in the first time period.

The first core may include an in-loop filter that conforms to a H.264 video coding standard, and the second core processes the third processing unit while the first core processes the second processing unit and performs in-loop filtering of a processed block in the second processing unit using the in-loop filter.

The first core may include an in-loop filter that conforms to a high efficient video coding (HEVC) standard, and the second core processes the third processing unit while the first core processes the second processing unit and performs in-loop filtering of a processed block in the second processing unit using the in-loop filter.

Each of the first processing unit, the second processing unit, the third processing unit, and the fourth processing unit may include at least one slice.

Each of the first processing unit, the second processing unit, the third processing unit, and the fourth processing unit may include at least one tile.

The first core may be embodied in a first hardware codec and the second core may be embodied in a second hardware codec.

The first core and the second core may be embodied in a single hardware codec.

The first core may be a first core of a central processing unit (CPU) and the second core may be a second core of the CPU.

The processing of the third processing unit may be performed after a delay of a processing time from the processing of the first processing unit.

According to an aspect of another exemplary embodiment, there is provided a system-on-chip (SoC) including a receiver interface configured to receive a first picture having a first processing unit and a second processing unit, and a second picture having a third processing unit and a fourth processing unit; a first core configured to process the first picture; and a second core configured to process the second picture, wherein the first core and the second core are configured to perform processing of the second processing unit and the third processing unit, respectively, in parallel.

When a number of slices in the second processing unit are different from a number of slices in the third processing unit, the first core may complete the processing of the second processing unit in a first time period and the second core may complete the processing of the third processing unit in the first time period.

When a number of tiles in the second processing unit are different from a number of tiles in the third processing unit, the first core may complete the processing of the second processing unit in a first time period and the second core may complete the processing of the third processing unit in the first time period.

The first core may include an in-loop filter that conforms to a H.264 video coding standard, and the second core may process the third processing unit while the first core processes the second processing unit and performs in-loop filtering of a processed block in the second processing unit using the in-loop filter.

The first core may include an in-loop filter that conforms to a high efficient video coding (HEVC) standard, and the second core may process the third processing unit while the first core processes the second processing unit and performs in-loop filtering of a processed block in the second processing unit using the in-loop filter.

According to an aspect of another exemplary embodiment, there is provided a data processing system including a receiver interface configured to receive a first picture having a first processing unit and a second processing unit, and a second picture having a third processing unit and a fourth processing unit; a first core configured to process the first picture; and a second core configured to process the second picture, wherein the first core and the second core are configured to perform processing of the second processing unit and the third processing unit, respectively, in parallel.

When a number of slices in the second processing unit are different from a number of slices in the third processing unit, the first core may complete the processing of the second processing unit in a first time period and the second core may complete the processing of the third processing unit in the first time period.

When a number of tiles in the second processing unit are different from a number of tiles in the third processing unit, the first core may complete the processing of the second processing unit in a first time period and the second core may complete the processing of the third processing unit in the first time period.

The first core may include an in-loop filter that conforms to a H.264 video coding standard, and the second core may process the third processing unit while the first core processes the second processing unit and performs in-loop filtering of a processed block in the second processing unit using the in-loop filter.

The first core may include an in-loop filter that conforms to a high efficient video coding (HEVC) standard, and the second core may process the third processing unit while the first core processes the second processing unit and performs in-loop filtering of a processed block in the second processing unit using the in-loop filter.

The receiver interface may be a wireless interface.

The processing of the third processing unit may be performed after a delay of a processing time from the processing of the first processing unit.

According to an aspect of another exemplary embodiment, there is provided a method for processing video data including assigning a first picture of the video data to a first core and a second picture of the video data to a second core; processing a first processing unit of the first picture by the first core; processing a second processing unit of the first picture by the first core; processing a third processing unit of the second picture by the second core in parallel with the processing of the second processing unit by the first core; and performing in-loop filtering of the processed first processing unit and the processed second processing unit based on a processing result of the first processing unit.

Each of the first processing unit, the second processing unit, and the third processing unit may include at least one slice or tile.

The video data may include odd pictures and even pictures, and all the odd pictures of the video data may be assigned to the first core, and all the even pictures of the video data may be assigned to the second core until processing of the video data is completed.

The method may further include assigning a third picture of the video data to a third core; and processing a fourth processing unit of the third picture by the third core in parallel with the processing of the third processing unit of the second picture.

According to an aspect of another exemplary embodiment, there is provided an application processor including a first core; and a second core, wherein the first core processes a first set of blocks of a first picture while the second core performs no processing, and the first core processes a second set of blocks of the first picture while the second core processes a first set of blocks of a second picture.

The first core may process the second set of blocks of the first picture and the second core may process the first set of blocks of a second picture in parallel.

The first core may start processing the second set of blocks of the first picture at the same time that the second core starts processing the first set of blocks of the second picture.

BRIEF DESCRIPTION OF THE DRAWINGS

The above and other aspects will become more apparent by describing in detail exemplary embodiments thereof with reference to the accompanying drawings in which.

DETAILED DESCRIPTION OF EXEMPLARY EMBODIMENTS

Figure 1:
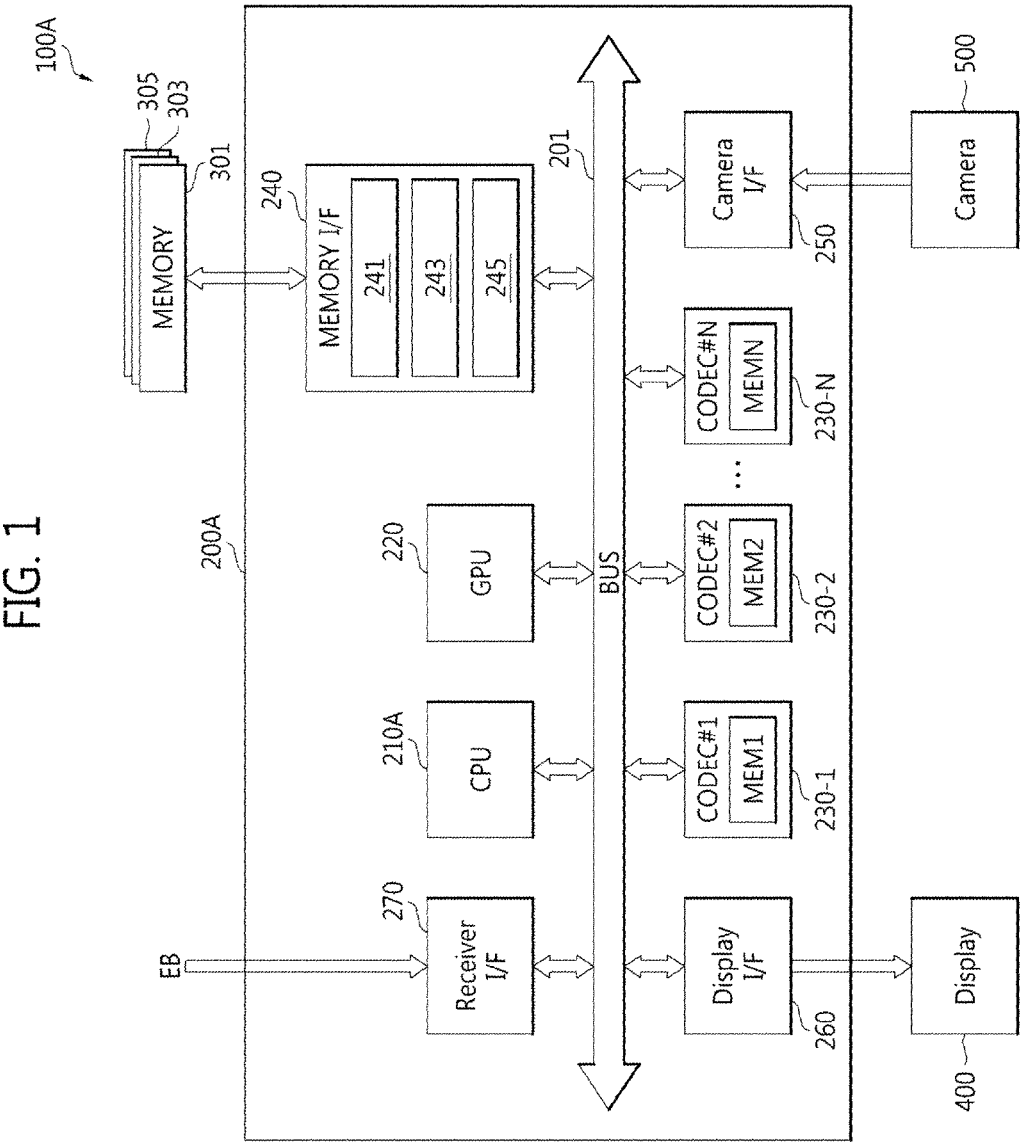
FIG. 1 is a block diagram of a data processing system according to an exemplary embodiment.

Various exemplary embodiments will now be described more fully hereinafter with reference to the accompanying drawings, in which exemplary embodiments are shown. The present inventive concept may, however, be embodied in different forms and should not be construed as limited to the exemplary embodiments set forth herein. Rather, these exemplary embodiments are provided so that this disclosure will be thorough and complete, and will fully convey the scope of the present inventive concept to those skilled in the art. The same reference numbers may indicate the same components throughout the specification. In the attached figures, the thickness of layers and regions may be exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the exemplary embodiments, especially in the context of the following claims, are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this present inventive concept belongs. It is noted that the use of any and all examples, or exemplary terms provided herein is intended merely to better illuminate the present inventive concept and is not a limitation on the scope of the present inventive concept unless otherwise specified. Further, unless defined otherwise, all terms defined in generally used dictionaries may not be overly interpreted.

The exemplary embodiments will be described with reference to perspective views, cross-sectional views, and/or plan views. Thus, the profile of an exemplary view may be modified according to manufacturing techniques and/or allowances. That is, the exemplary embodiments are not intended to limit the scope of the present inventive concept but cover all changes and modifications that can be caused due to a change in manufacturing process. Thus, regions shown in the drawings are illustrated in schematic form and the shapes of the regions are presented simply by way of illustration and not as a limitation.

Various exemplary embodiments will be described more fully hereinafter with reference to the accompanying drawings.

A picture or a processing unit (i.e., a unit to be processed) in various exemplary embodiments may include one or more divided regions, for example, slices or tiles. According to exemplary embodiments, a picture may be processed by a core. In other words, all divided regions, for example, all slices or all tiles, in a picture may be processed by a single core. Here, process may mean encode, decode, encode including in-loop filtering or decode including in-loop filtering.

In various exemplary embodiments, a picture can be divided into slices. The slice defines a sequence of an integer number of macroblocks (MBs) or Coding Tree Units (CTUs) for AVC or HEVC, respectively. In exemplary embodiments for HEVC, a picture can also be divided into tiles. The tile defines a rectangular region of an integer number of CTUs and may include CTUs contained in more than one slice.

In some exemplary embodiments, the data processing system 100A, 100B, or 100C may be embodied in a full High Definition (FHD) TV or Ultra High Definition (UHD) TV. In addition, the data processing system 100A, 100B, or 100C may be compatible with a video coding standard such as H.264, High Efficiency Video Coding (HEVC), and so on.

In some exemplary embodiments, the data processing system 100A, 100B or 100C may be implemented on a personal computer (PC), a smart phone, a tablet PC, a mobile internet device (MID), a laptop computer, a mobile digital media player (M-DMP), or a portable media player (PMP).

FIG. 1 is a block diagram of a data processing system according to an exemplary embodiment. Referring to FIG. 1, a data processing system 100A may include a controller 200A, a plurality of memories 301, 303 and 305, and a display 400. In some exemplary embodiments, the data processing system 100A may further include a camera 500.

The controller 200A may be implemented as an Integrated Circuit (IC), a system on chip (SoC), a mother board, an Application Processor (AP) or a mobile AP.

The controller 200A may receive and encode input uncompressed YUV/RGB data or decode an encoded bit stream, control operations such as read/write operations of the plurality of memories 301, 303 and 305, and transmit display data or video data to the display 400. In addition, the controller 200A may process image data or video data output from the camera 500, and may store the processed image data or the processed video data in at least one of the plurality of memories 301, 303 and 305 and/or transmit the processed image data or the processed video data to the display 400.

The controller 200A may include a central processing unit (CPU) 210A, a graphic processing unit (GPU) 220, a plurality of hardware codecs 230-1 to 230-N, N being a natural number equal to or greater than 2, a memory interface (I/F) 240, a display interface (I/F) 260 and a receiver interface (I/F) 270. When the data processing system 100A further includes a camera 500, the controller 200A may further include a camera interface (I/F) 250.

The CPU 210A, the GPU 220, the plurality of hardware codecs 230-1 to 230-N, the memory interface 240, the display interface 260, and the receiver interface 270 may transmit or receive data from/to each other through a bus

201. The camera interface 250 may be connected to and transmit/receive data from/to the other components, e.g., 210A and/or 220.

The CPU 210A may include one or more cores. The CPU 210A may control an overall operation of the controller 200A. For example, the CPU 210A may execute program codes or applications for controlling operations of the GPU 220, the plurality of hardware codecs 230-1 to 230-N, the memory interface 240, the camera interface 250, the display interface 260, and/or the receiver interface 270.

The GPU 220 may be process 2D or 3D graphic data. The graphic data processed by the GPU 220 may be stored in at least one of the plurality of memories 301, 303 and 305 or may be displayed by the display 400.

The plurality of hardware codecs 230-1 to 230-N may be substantially the same in view of structure and operation. In some exemplary embodiments, each of the plurality of hardware codecs 230-1 to 230-N may be called a core. Each of the plurality of hardware codecs 230-1 to 230-N may include one of memories MEM1 to MEMN respectively. Each of the memories MEM1 to MEMN may store information of one or more encoded and/or decoded pictures and/or perform in-loop filtering of the one or more encoded and/or decoded pictures.

The memory interface 240 may include a first memory interface 241, a second memory interface 243 and a third memory interface 245. For example, when the first memory 301 of the plurality of memories 301, 303, 305 is a dynamic random access memory (DRAM), the first memory interface 241 may be a DRAM interface. When the second memory 303 is a NAND flash memory, the second memory interface 243 may be a NAND flash interface. When the third memory 305 is an embedded multimedia card (eMMC), the third memory interface may be eMMC interface. For convenience of description, in FIG. 1, three memory interfaces 241, 243 and 245 and three memories 301, 303 and 305 are illustrated; however, this is only an example, and the number of memories is not particularly limited. Therefore, a technical concept of the present inventive concept is not limited by the number of memory interfaces and memories connected to the memory interfaces.

The display interface 260 may transmit display data, for example, video data, to the display 400 under a control of CPU 210A, GPU 220, or each of the plurality of hardware codecs 230-1 to 230-N. In some exemplary embodiments, the display interface 260 may be embodied as a display serial interface (DSI) of a mobile industry processor interface MIPI®, an embedded display port (eDP) interface, or a high-definition multimedia interface (HDMI), etc. However, these interfaces are only exemplary, and the display interface 260 is not limited thereto.

The receiver interface 270 may receive uncompressed picture data (RGB/YUV) or/and an encoded bit stream through a wired communication network or a wireless communication network. In some exemplary embodiments, the receiver interface 270 may be embodied as a universal serial bus interface (USB), an Ethernet interface, a Bluetooth interface, a Wi-Fi interface, or a long term evolution (LTE™) interface, etc. However, these interfaces are only exemplary, and the receiver interface 270 is not limited thereto.

The camera interface 250 may receive image data output from the camera 500. In some exemplary embodiments, the camera interface 250 may be a camera serial interface (CSI) of a MIPI®. However, this interface is only exemplary, and the camera interface 250 is not limited thereto. The camera 500 may a camera module including a CMOS image sensor.

Figure 2:
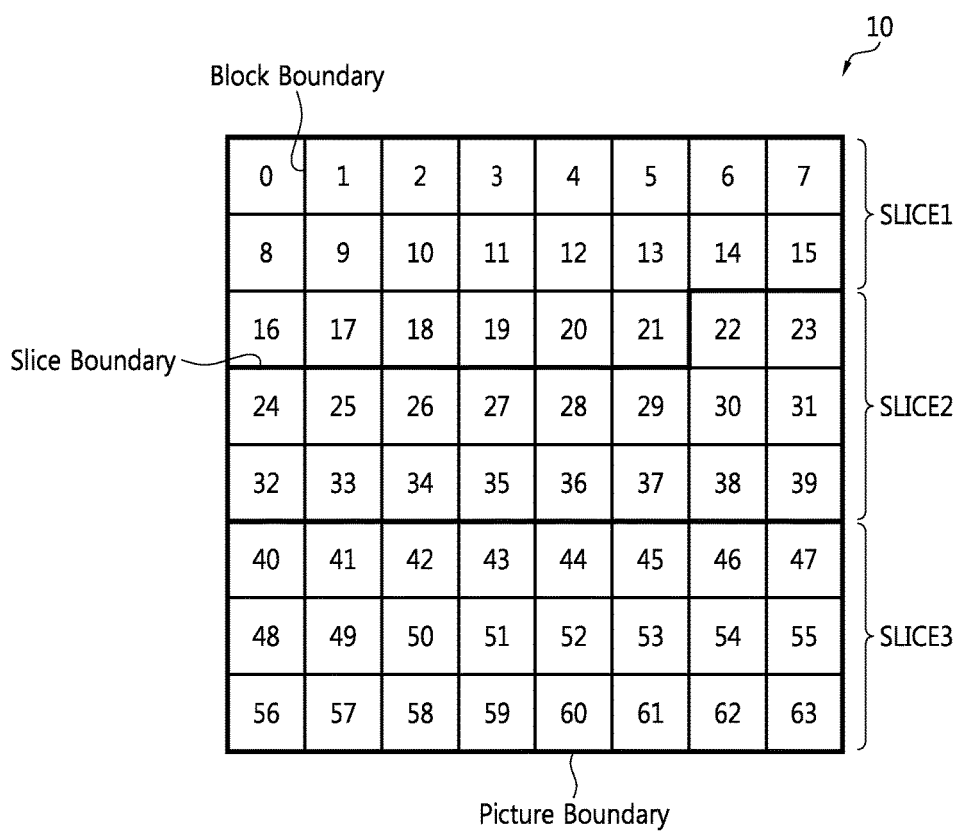
FIG. 2 is a conceptual diagram illustrating a picture including a plurality of slices.

FIG. 2 is a conceptual diagram illustrating a picture including a plurality of slices.

Referring to FIG. 2, a picture 10 may include a plurality of slices SLICE1 to SLICE3 and each of the plurality of slices SLICE1 to SLICE3 may include a plurality of blocks. For example, as shown in the example of FIG. 2, SLICE1 may include blocks 0-21, SLICE2 may include blocks 22-39, and SLICE3 may include blocks 40-63. A number of blocks included in each of the plurality of slices SLICE1 to SLICE3 may be different from each other. Alternatively, the number of blocks included in each of the plurality of slices SLICE1 to SLICE3 may be the same for each slice. The picture 10 may be a frame to encode, an original picture, a raw bitstream of a picture to encode, a frame to decode, an encoded picture, or an encoded bitstream EB. FIG. 2 shows a picture having 64 blocks, i.e., blocks 0-63. However, this is only an example, and the number of blocks may be more or less than 64.

In the H.264 video coding standard, the block may be a macroblock. In a high efficiency video coding (HEVC) standard, the block may be a coding tree unit (CTU). In some exemplary embodiments, the picture 10 may be a frame to encode, an original picture, a raw bitstream of a picture to encode, a frame to decode, an encoded picture, or an encoded bitstream EB, etc.

An encoder may encode the blocks in a picture and a decoder may decode the blocks in a picture from a block 0 to a block 63 sequentially.

After a first block 0 in the first slice SLICE1 is processed, the encoder or decoder does not perform in-loop filtering of the processed first block 0 edges because there is no block before the processed first block 0. On the other hand, after processing a second block 1 in the first slice SLICE1, the encoder or decoder may perform in-loop filtering of the first block 0 edge and the second block 1 based on a first video data of the processed first block 0 and a second video data of the processed second block 1. That is, the encoder or decoder may perform in-loop filtering on a block boundary. Here, block boundary denotes a boundary between two blocks.

After a 23rd processed block 22 in the second slice SLICE2 is processed, the encoder or the decoder may perform an in-loop filtering of the 23rd processed block 22 edge in the second SLICE2 and prior blocks 14 and 21 in the first slice SLICE1 based on video data of the blocks 14, 21 and 23. That is, the encoder or decoder may perform in-loop filtering on a slice boundary.

After a 41st processed block 40 in the third slice SLICE3 is processed, the encoder or decoder may perform an in-loop filtering of the 41st processed block 40 edge in the third SLICE3 and prior block 32 in the second slice SLICE2 based on video data of the 33rd block 32. That is, the encoder or decoder may perform in-loop filtering on a slice boundary. In other words, in-loop filtering of a current processed block may be performed using at least one of an upper processed block and a left processed block adjacent to the current block.

According to exemplary embodiments, a decoder including an in-loop filter that conforms to a video coding standard of H.264 may perform in-loop filtering for each block. According to exemplary embodiments, a decoder including an in-loop filter that conforms to a video coding standard of HEVC may perform in-loop filtering for each block. For example, a decoder may perform in-loop filtering of a plurality of blocks adjacent to a current decoded block on a block boundary, or perform in-loop filtering of all pixels in the current decoded block according to a video coding standard of sample adaptive offset (SAO).

The in-loop filtering according to the video coding standard of H.264 may be performed based on a motion vector, prediction mode information, and/or a quantization parameter, etc. The in-loop filtering according to the video coding standard of HEVC may be performed based on a motion vector, prediction mode information, a quantization parameter, and/or a plurality of parameters of SAO filter, etc. The prediction mode may include intra-prediction mode information or inter-prediction mode information.

Figure 3:
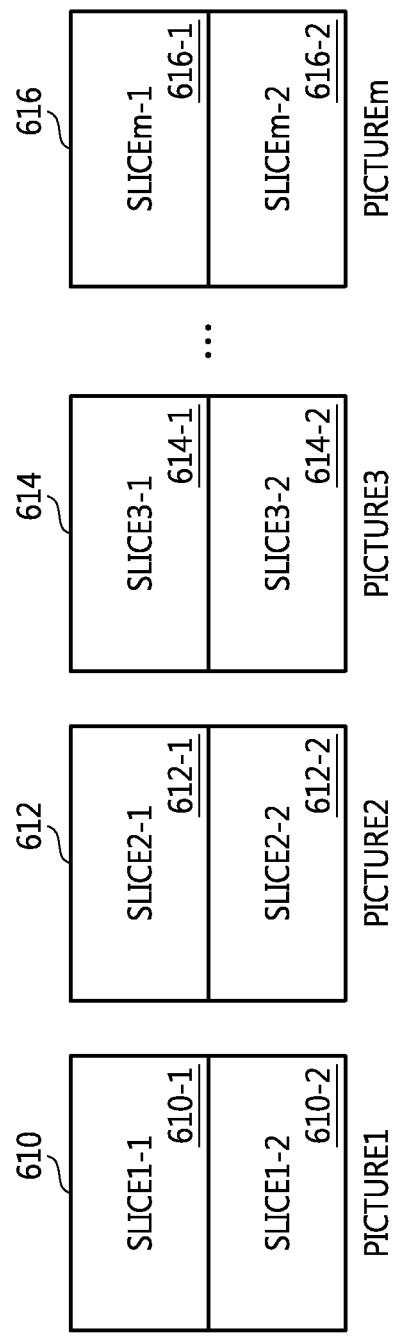
FIG. 3 a conceptual diagram illustrating a sequence of pictures including two slices respectively.
Figure 4:
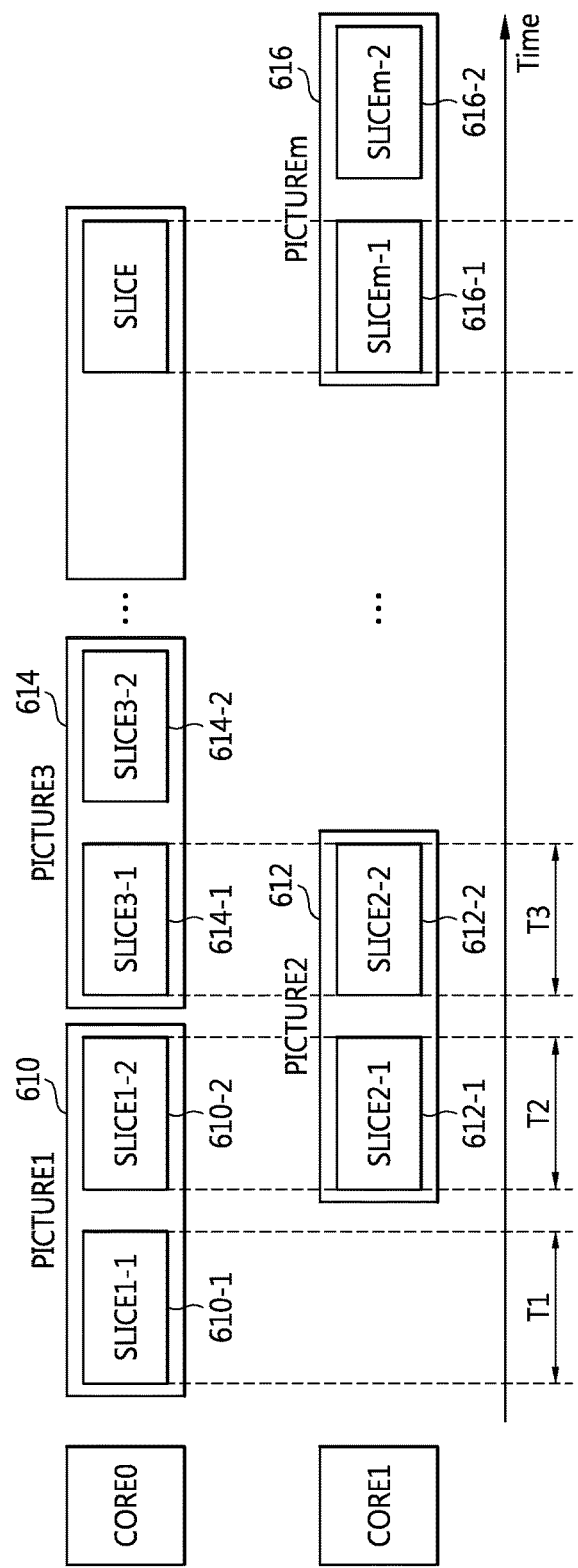
FIG. 4 is a conceptual diagram illustrating a procedure to process the sequence of pictures shown in FIG. 3 by two cores.

FIG. 3 a conceptual diagram illustrating a sequence of pictures including two slices respectively. FIG. 4 is a conceptual diagram illustrating a procedure to process the sequence of pictures shown in FIG. 3 by two cores.

Referring to FIGS. 1, 3 and 4, the controller 200A may include two hardware codecs 230-1 and 230-2. A first core CORE0 may be a first hardware codec 230-1 and a second core CORE1 may be a second hardware codec 230-2. The encoder or decoder described with reference to FIG. 2 may be included in the first core CORE0 and the second core CORE1.

Referring to FIG. 3, each of the plurality of pictures 610, 612, 614,..., and 616 such as PICTURE1, PICTURE2, PICTURE3... and PICTUREm may include two slices 610-1~610-2, 612-1~612-2, 614-1~614-2,..., and 616-1~616-2, respectively. Each of the plurality of pictures 610, 612, 614,..., and 616 may include a first processing unit 610-1, 612-1, 614-1, ..., and 616-1, respectively, and a second processing unit 610-2, 612-2, 614-2, ..., and 616-2, respectively. As used in the present disclosure, "processing unit" denotes a unit of data to be processed. For example, each of the plurality of pictures 610, 612, 614,..., and 616 may mean a frame to encode, an original picture, a raw bitstream of a picture to encode, a frame to decode, an encoded picture, or an encoded bitstream EB received from the receiver interface 270, etc.

In some exemplary embodiments, the CPU 210A may control the receiver interface 270 such that an odd picture may be assigned to the first core CORE0 and an even picture may be assigned to the second core CORE1.

In some exemplary embodiments, the CPU 210A may control the first core CORE0 and the second core CORE1 such that odd pictures may be assigned to the first core CORE0 and even pictures may be assigned to the second core CORE1.

Referring to FIG. 4, in a first time period T1, the first core CORE0 may process the first slice 610-1 of the first picture 610. The first slice 612-1 of the second picture 612 may be processed by the second core CORE1 in a second time period T2 after processing of the first slice 610-1 of the first picture 610 in the first time period T1 has been completed by the first core CORE0.

In the second time period T2, the first core CORE0 may process the second slice 610-2 of the first picture 610 and the second core CORE1 may process the first slice 612-1 of the second picture 612. The processing of the first slice 612-1 and the second slice 610-2 may be performed in parallel in the second time period T2. As used in this specification, "processing . . . performed in parallel" denotes that there is some overlap in the processing. Thus, here, "parallel" denotes that there is some overlap in the processing of the first slice 612-1 and the second slice 610-2. That is, while dotted lines are used in FIGS. 4, 6, 8, 11, 14, these lines are only provided for ease of description and are not intended to suggest that the start times or the end times for processing exactly coincide. For example, the dotted lines in FIG. 4 are not intended to suggest that the start times or the end times for processing the first slice 612-1 and the second slice 610-2 exactly coincide. However, in some exemplary embodiments, the start times may exactly coincide and/or the end times may exactly coincide.

In addition, in the second time period T2, the first core CORE0 may perform in-loop filtering on a boundary of the first slice 610-1 and the second slice 610-2 of the first picture 610 for each block based on a processing result of the first slice 610-1 in the first picture 610. As described with reference to FIG. 2, the first core CORE0 may perform in-loop filtering of a current processed block using at least one of an upper processed block and a left processed block adjacent to the current block. That is, the first core CORE0 may perform the processing of the second slice 610-2 and the in-loop filtering of the first slice 610-1 and the second slice 610-2 in the second time period T2 so that no additional time is used for the in-loop filtering.

In a third time period T3, the first core CORE0 may process the first slice 614-1 of the third picture 614 and the second core CORE1 may process the second slice 612-2 of the second picture 612. The processing of the first slice 614-1 of the third picture 614 and the second slice 612-2 of the second picture 612 may be performed in parallel in the second time period T3.

In addition, in the third time period T3, the second core CORE1 may perform in-loop filtering on a boundary of the first slice 612-1 and the second slice 612-2 for each block based on a processing result of the first slice 612-1 in the second picture 612. That is, the second core CORE1 may perform the processing of the second slice 612-2 and the in-loop filtering of edge of the first slice 612-1 and the second slice 612-2 of the second picture 612 in the third time period T3 so that no additional time is used for the in-loop filtering. The second core CORE1 thus may have a 1 slice delay as shown in FIG. 4. That is, the second core CORE1 may start processing the first slice 612-1 of the second picture 612 after the first core CORE0 has finished processing the first slice 610-1 of the first picture 610.

Figure 5:
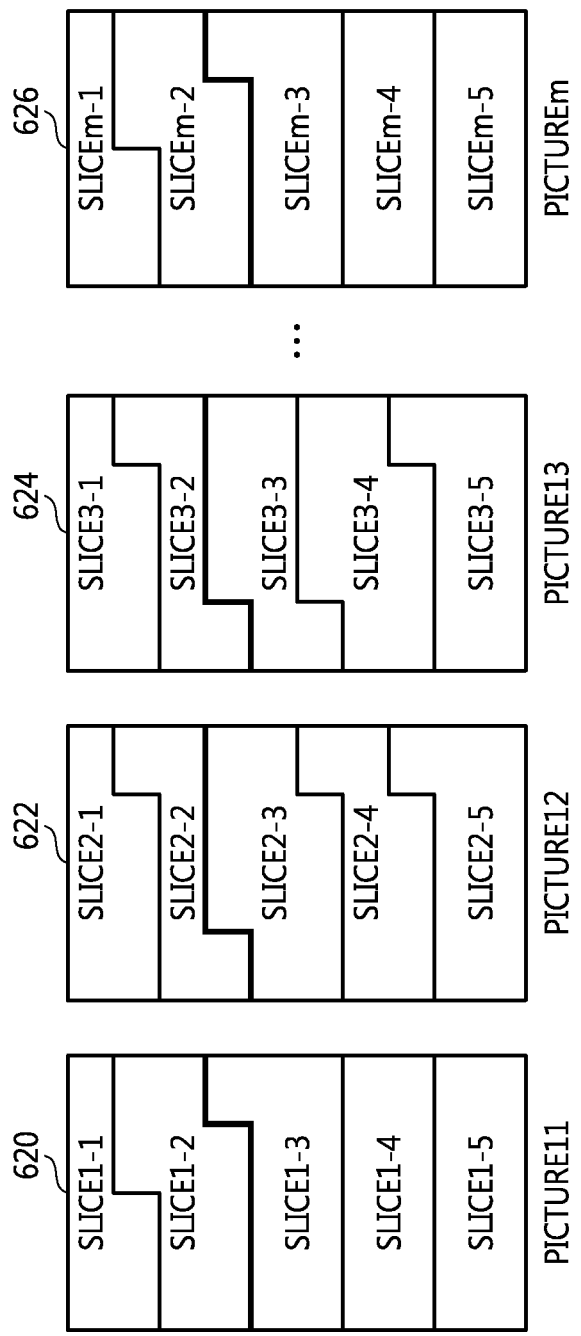
FIG. 5 is a conceptual diagram illustrating a sequence of pictures including two slice groups respectively.
Figure 6:
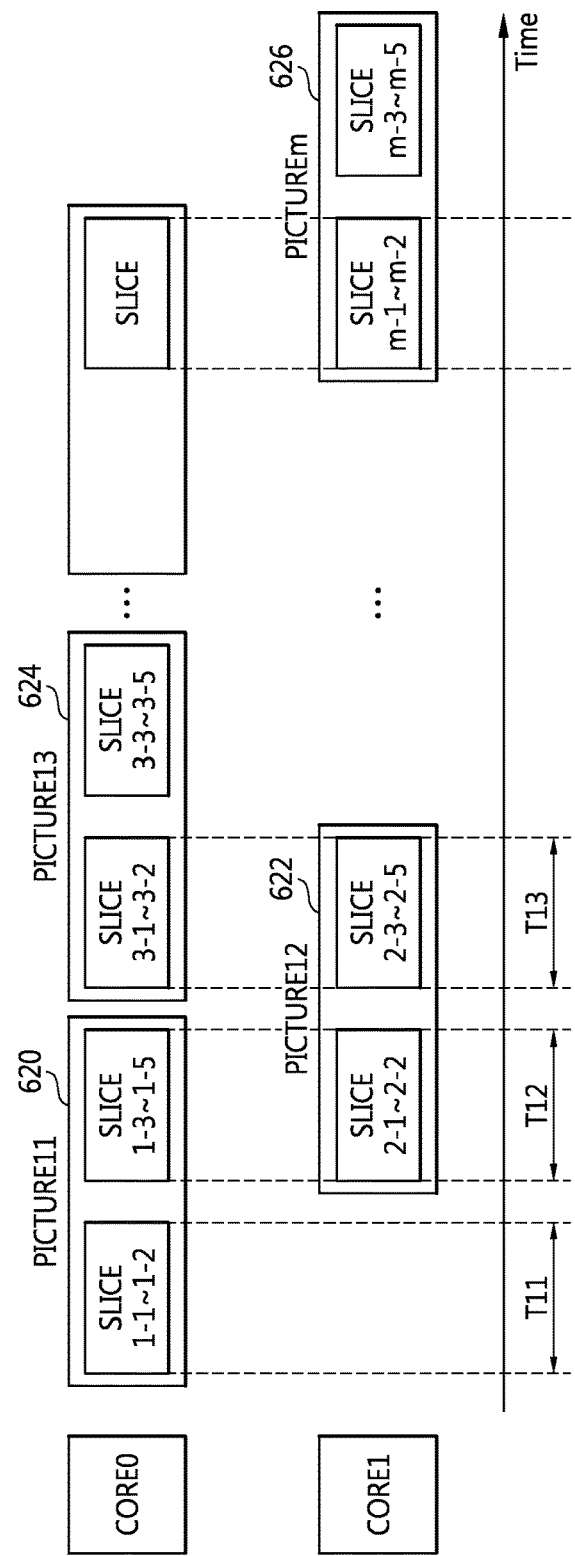
FIG. 6 is a conceptual diagram illustrating a procedure to process the sequence of pictures shown in FIG. 5 by two cores.

FIG. 5 is a conceptual diagram illustrating a sequence of pictures including two slice groups respectively. FIG. 6 is a conceptual diagram illustrating a procedure to process the sequence of pictures shown in FIG. 5 by two cores.

The controller 200A shown in FIG. 1 may include two hardware codecs 230-1 and 230-2 that may correspond to a first core CORE0 and a second CORE1 respectively. The sequence of pictures may include, for example, pictures 620, 622, 624, and 626 such as PICTURE11, PICTURE12, PICTURE13... and PICTUREm.

The first core CORE0 may divide the picture 620 into a first processing unit and a second processing unit based on processing complexity or size of a plurality of divided regions in the picture 620. In FIGS. 5 and 6, the first processing unit may include two slices SLICE1-1 and SLICE1-2, and the second processing unit may include three slices SLICE1-3 to SLICE1-5. The first processing unit is shown above the bold line in FIG. 5, and the second processing unit is shown below the bold line in FIG. 5. FIG. 5 shows that each of the first processing units includes two slices, e.g., the first picture 620 includes a first processing unit with SLICE1-1 and SLICE1-2. However, this is only an example, and the first processing unit may have a number of slices that is fewer or greater than two slices, depending on the complexity or size of the plurality of divided regions.

The second core CORE1 may divide the picture 622 into a first processing unit and a second processing unit based on processing complexity of the picture 622. In FIGS. 5 and 6, the first processing unit may include two slices SLICE2-1 and SLICE2-2, and the second processing unit may include three slices SLICE2-3 to SLICE2-5.

For example, when the pictures 620, 622, 624 and 626 are not divided into a plurality of slices or tiles, or when a plurality of divided regions (e.g., slices or tiles) have different processing complexities, it is advantageous to define a plurality of divided regions for parallel processing of the plurality of cores CORE0 and CORE1 based on the processing complexities. Here, the first core CORE0 and the second core CORE1 may divide and process in parallel the plurality of divided regions of the pictures 620, 622, 624 and 626. The processing complexity may be defined by a decoding time and/or encoding time and/or size of slices in terms of blocks of a picture, etc.

When m is a natural number which is equal to or greater than 4 in FIG. 5, similarly, the first core CORE0 may divide the picture 624 into a first processing unit and a second processing unit based on processing complexity of the picture 624. In FIGS. 5 and 6, the first processing unit may include two slices SLICE3-1 and SLICE3-2, and the second processing unit may include three slices SLICE1-3 to SLICE1-5.

The second core CORE1 may divide the picture 626 into a first processing unit and a second processing unit based on processing complexity of the picture 626. In FIGS. 5 and 6, the first processing unit may include two slices SLICEm-1 and SLICEm-2, and the second processing unit may include three slices SLICEm-3 to SLICEm-5.

Although, each picture 620, 622, 624, . . . , or 626 is illustrated to be divided into a first processing unit and a second processing unit for the two cores CORE0 and CORE1, respectively, for the sake of convenient description of FIGS. 5 and 6, a number of processing units in a picture may vary according to a number of cores for processing the units.

For example, a processing time for processing the three slices SLICE1-3 to SLICE1-5 by the first core CORE0 and a processing time for processing the two slices SLICE2-1 to SLICE2-2 by the second core CORE1 may be substantially same. Here, the meaning of "substantially same" may include "equal, nearly the same, almost the same, or the same with allowable margin of difference".

As shown in FIG. 5, each picture 620, 622, 624, . . . , 626 may include five slices SLICE1-1 to SLICE1-5, SLICE2-1 to SLICE2-5, SLICE3-1 to SLICE3-5, . . . , SLICEm-1 to SLICEm-5 respectively. For example, each picture 620, 622, 624, . . . , 626 may be a frame to encode, an original picture, a raw bitstream of a picture to encode, a frame to decode, an encoded picture, or an encoded bitstream EB received through the receiver interface 270, etc.

Turning to FIG. 6, in a first time period T11, the first core CORE0 may process the first slice SLICE1-1 and the second slice SLICE1-2 of the first picture 620. In the first time period T11, the first core CORE0 may perform in-loop filtering on a boundary of the slices SLICE1-1 and SLICE1-2 for each block based on a processing result of the slice SLICE1-1.

In a second time period T12, the first core CORE0 may process the third slice SLICE1-3 to the fifth slice SLICE1-5 of the first picture 620, and the second core CORE1 may process the first slice SLICE2-1 and the second slice SLICE2-2 of the second picture 622. The processing of the third slice SLICE1-3 to the fifth slice SLICE1-5 and the processing of the first slice SLICE2-1 and the second slice SLICE2-2 may be performed in parallel in the second time period T12.

In the second time period T12, the first core CORE0 may perform in-loop filtering on a boundary of the slices SLICE1-2 and SLICE1-3 for each block based on the processing result of the slice SLICE1-2. In the second time period T12, the first core CORE0 may perform in-loop filtering on a boundary of the slices SLICE1-3 and SLICE1-4 for each block based on the processing result of the slice SLICE1-3 and may perform in-loop filtering on a boundary of the slices SLICE1-4 and SLICE1-5 for each block based on the processing result of the slice SLICE1-4. In addition, in the second time period T12, the second core CORE1 may perform in-loop filtering on a boundary of the slices SLICE2-1 and SLICE2-2 for each block based on the processing result of the slice SLICE2-1.

That is, in the second time period T12, the first core CORE0 may perform in-loop filtering for the three slices SLICE1-3 to SLICE1-5 and the second CORE1 may perform in-loop filtering for the two slices SLICE2-1 and SLICE2-2 so that no additional time is used for in-loop filtering, for example, no additional time for gathering distributed slices over the first core CORE0 and the second core CORE1.

In a third time period T13, the first core CORE0 may process the first slice SLICE3-1 and the second slice SLICE3-2 of the third picture 624. In the third time period T13, the first core CORE0 may perform in-loop filtering on a boundary of the slices SLICE3-1 and SLICE3-2 for each block based on the processing result of the slice SLICE3-1.

In the third time period T13, the first core CORE0 may process the first slice SLICE3-1 and the second slice SLICE3-2 of the third picture 624, and the second core CORE1 may process the third slice SLICE2-3 to the fifth slice SLICE2-5 of the second picture 622. The processing of the third slice SLICE2-3 to the fifth slice SLICE2-5 and the processing of the first slice SLICE3-1 and the second slice SLICE3-2 may be performed in parallel in the third time period T13.

In the third time period T13, the first core CORE0 may perform in-loop filtering on a boundary of the slices SLICE3-1 and SLICE3-2 for each block based on the processing result of the slice SLICE3-1. In addition, in the third time period T13, the second core CORE1 may perform in-loop filtering on a boundary of the slices SLICE2-2 and SLICE2-3 for each block based on the processing result of the slice SLICE2-2. In the third time period T13, the second core CORE1 may perform in-loop filtering on a boundary of the slices SLICE2-3 and SLICE2-4 for each block based on the processing result of the slice SLICE2-3 and may perform in-loop filtering on a boundary of the slices SLICE2-4 and SLICE2-5 for each block based on the processing result of the slice SLICE2-4.

That is, in the third time period T13, the first CORE0 may perform in-loop filtering for the two slices SLICE3-1 and SLICE3-2, and the second core CORE1 may perform in-loop filtering for the three slices SLICE2-3 to SLICE2-5 so that no additional time is used for in-loop filtering, for example, no additional time for gathering distributed slices over the first core CORE0 and the second core CORE1.

Figure 7:
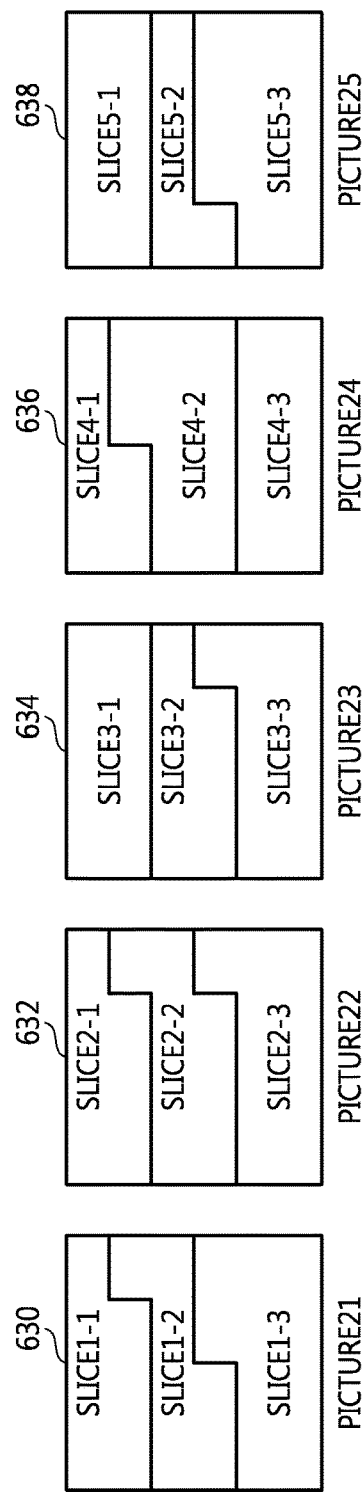
FIG. 7 is a conceptual diagram illustrating a sequence of pictures including three slices respectively.
Figure 8:
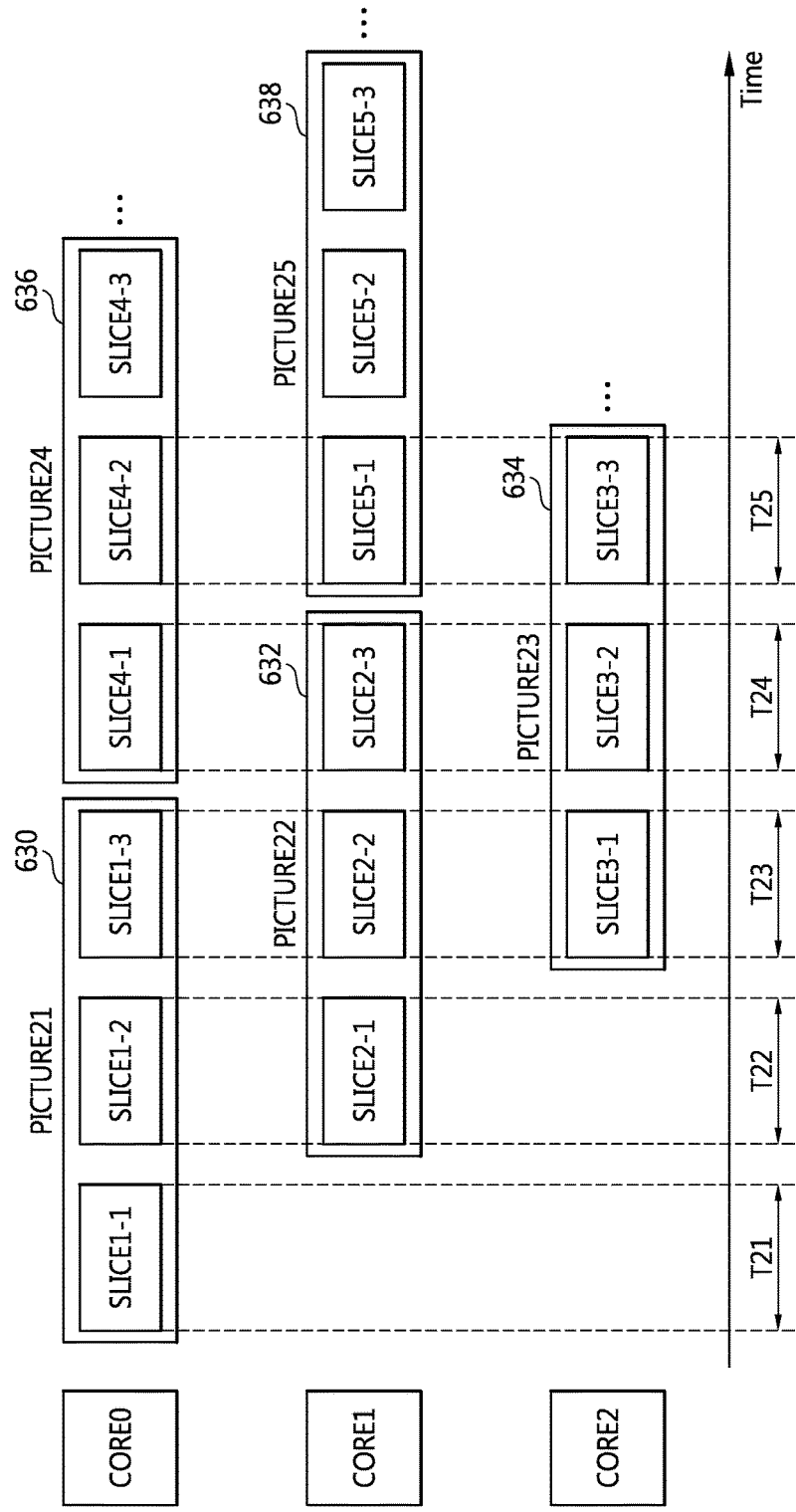
FIG. 8 is a conceptual diagram illustrating a procedure to process the sequence of pictures shown in FIG. 7 by three cores.

FIG. 7 is a conceptual diagram illustrating a sequence of pictures including three slices respectively. FIG. 8 is a conceptual diagram illustrating a procedure to process the sequence of pictures shown in FIG. 7 by three cores.

The controller 200A shown in FIG. 1 may include three hardware codecs 230-1, 230-2 and 230-3 that may correspond to a first core CORE0, a second CORE1 and a third core CORE2, respectively. The encoder or/and decoder described in FIG. 2 may be embedded in each of the cores CORE0, CORE1 and CORE2.

As shown in FIG. 7, each picture 630, 632, 634, 636, and 638 such as PICTURE21, PICTURE22, PICTURE23, PICTURE24 and PICTURE25 may include three slices, respectively. Each picture 630, 632, 634, 636, and 638 may include a first processing unit, a second processing unit and a third processing unit. That is, each of the first processing unit, the second processing unit and the third processing unit may correspond to one of the three slices, respectively. Each picture 630, 632, 634, 636, and 638 may be a frame to encode, an original picture, a raw bitstream of a picture to encode, a frame to decode, an encoded picture, or an encoded bitstream EB received through the receiver interface 270, etc.

Turning to FIG. 8, in a first time period T21, the first core CORE0 may process the first slice SLICE1-1 of the first picture 630.

In a second time period T22, the first core CORE0 may process the second slice SLICE1-2 of the first picture 630, and the second core CORE1 may process the first slice SLICE2-1 of the second picture 632. The processing of the second slice SLICE1-2 and the processing of the first slice SLICE2-1 may be performed in parallel in the second time period T22.

In the second time period T22, the first core CORE0 may perform in-loop filtering on a boundary of the slices SLICE1-1 and SLICE1-2 for each block based on the processing result of the slice SLICE1-1.

For parallel processing, a one (1) slice delay may be assigned to the second core CORE1 and a two (2) slice delay may be assigned to the third core CORE2.

In a third time period T23, the first core CORE0 may process the third slice SLICE1-3 of the first picture 630, the second core CORE1 may process the second slice SLICE2-2 of the second picture 632, and the third core CORE2 may process the first slice SLICE3-1 of the third picture 634.

In the third time period T23, the processing of the third slice SLICE1-3, the processing of the second slice SLICE2-2 and the first slice SLICE1-3 may be performed in parallel.

In the third time period T23, the first core CORE0 may perform in-loop filtering on a boundary of the slices SLICE1-2 and SLICE1-3 for each block based on the processing result of the slice SLICE1-2, and the second core CORE1 may perform in-loop filtering on a boundary of the slices SLICE2-1 and SLICE2-2 for each block based on the processing result of the slice SLICE2-1.

In a fourth time period T24, the first core CORE0 may process a first slice SLICE4-1 of the fourth picture 636, the second core CORE1 may process the third slice SLICE2-3 of the second picture 632, and the third core CORE2 may process the second slice SLICE3-2 of the third picture 634. That is, once the first core CORE0 finishes processing the slices of the first picture 630, the first core CORE0 proceeds to the next picture in the sequence of pictures, in this case the fourth picture 636.

In the fourth time period T24, the processing of the first slice SLICE4-1, the processing of the third slice SLICE2-3 and the processing of the second slice SLICE3-2 may be performed in parallel.

In the fourth time period T24, the second core CORE1 may perform in-loop filtering on a boundary of the slices SLICE2-2 and SLICE2-3 for each block based on the processing result of the slice SLICE2-2, and the third core CORE2 may perform in-loop filtering on a boundary of the slices SLICE3-1 and SLICE3-2 for each block based on the processing result of the slice SLICE3-1.

In a fifth time period T25, an operation of each core of the cores CORE0, CORE1, and CORE2 may continue to process respective slices in a similar way as in the operation in the first through fourth time periods T21-T24.

Figure 9:
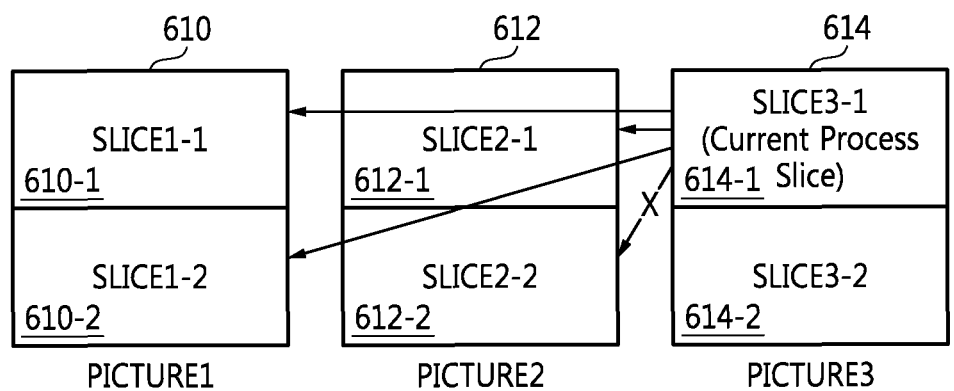
FIG. 9 is a conceptual diagram illustrating a motion vector search according to an exemplary embodiment.

FIG. 9 is a conceptual diagram illustrating a motion vector search. Referring to FIGS. 3, 4, and 9, when a current processing slice is a first slice 614-1 of a third picture 614, the first core CORE0 may search processed slices 610-1, 610-2 and 612-1 to find the best motion vector. For example, as each of the slices 612-2 and 614-1 is processed in parallel by the different cores CORE0 and CORE1, the first core cannot refer to the second slice 612-2 of the second picture 612 which is now being processed. Also the slice 614-1 may not be able to refer to few bottom pixels of slice 612-1 as the edge between slice 612-1 and 612-2 may be under an in-loop filtering operation at the time of processing of slice 614-1 (In the H264 standard, the few bottom pixels may be 6 pixels).

The data processing system 100A may encode the third picture 614 to avoid or reduce the dependency among the slices SLICE2-2 and SLICE3-1 in parallel processing by determining a reference picture and a coordinate of a matching block (or a reference block) based on the dependency. For example, when the first slice 614-1 is encoded, a motion vector of a macro block in the first slice 614-1 may be determined to avoid dependency by making the macro block refer to one of the slices 610-1, 610-2 and 612-1 instead of the second slice 612-2 with some restriction of the bottom pixels being processed by the in-loop filtering operation. As a result, the dependency in parallel processing may be reduced.

The data processing system 100A may generate and refer to a motion constraint slice group to reduce dependency between slices processed in parallel when the slices are encoded. The motion constraint slice group may include information to restrict a reference picture or a reference region of a previous picture which is referred to by a current processing slice. The motion constraint slice group may be stored in a memory 301, 303 or 305 in the data processing system 100A, or in a memory in each of the cores 230-1 to 230-N.

Figure 10:
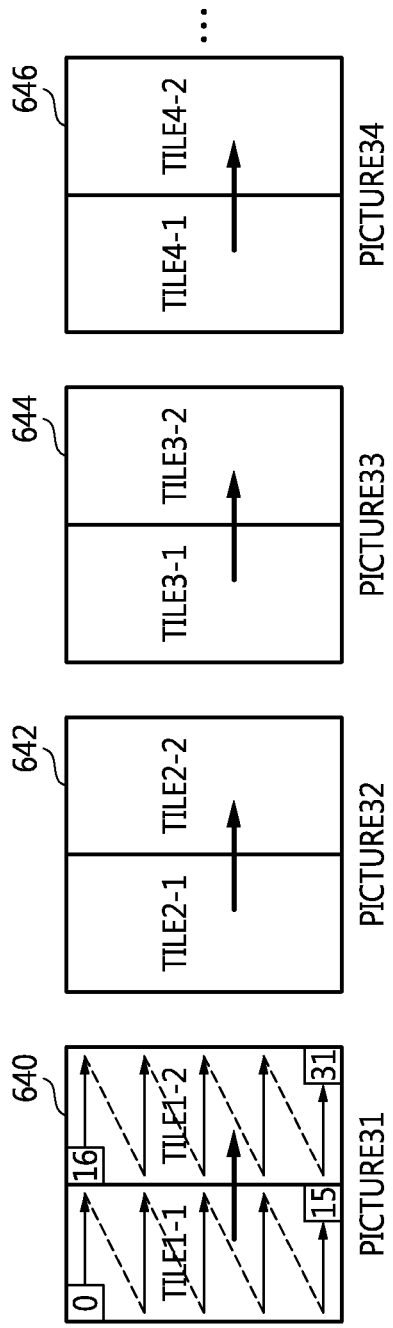
FIG. 10 a conceptual diagram illustrating a sequence of pictures each of which includes two tiles according to exemplary embodiment.
Figure 11:
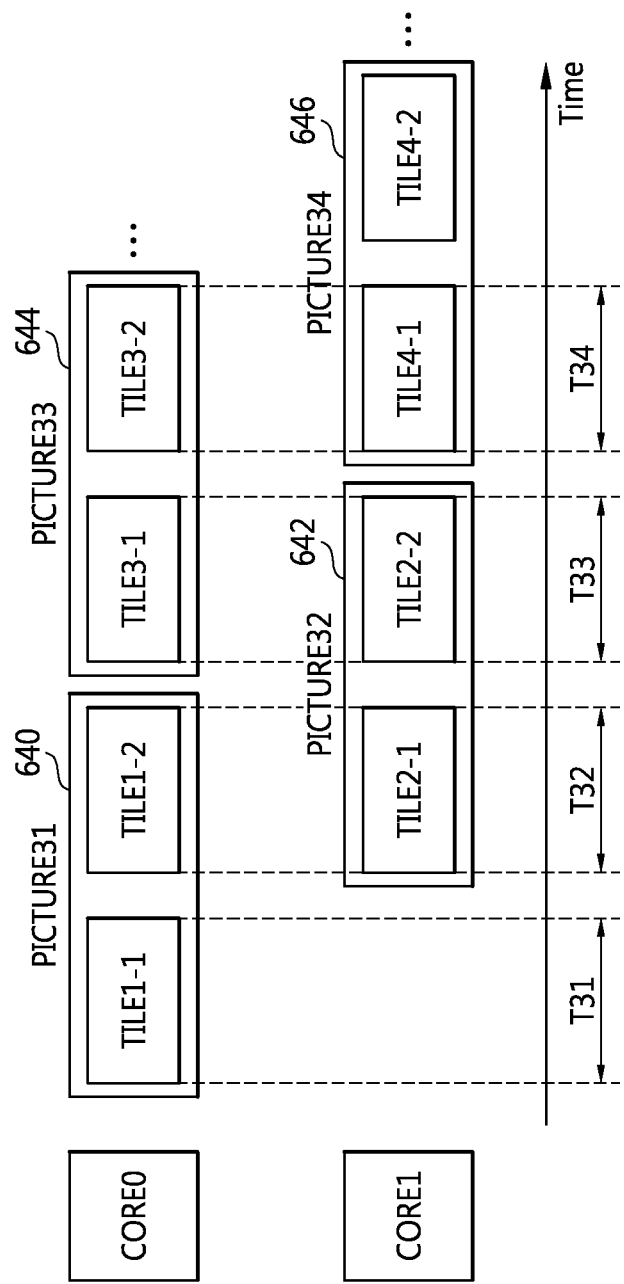
FIG. 11 a conceptual diagram illustrating a procedure to process the sequence of pictures shown in FIG. 10 by two cores.

FIG. 10 a conceptual diagram illustrating a sequence of pictures each of which includes two tiles according to exemplary embodiment. FIG. 11 a conceptual diagram illustrating a procedure to process the sequence of pictures shown in FIG. 10 by two cores.

An arrow shown in each of a plurality of pictures 640, 642, 644 and 646 such as PICTURE31, PICTURE32, PICTURE33 and PICTURE34 illustrate a processing direction or a processing order of a plurality of tiles in the plurality of pictures 640, 642, 644 and 646.

The controller 200A in FIG. 1 may include two hardware codecs 230-1 and 230-2. A first core CORE0 may be a first hardware codec 230-1 and a second core CORE1 may be a second hardware codec 230-2. In some exemplary embodiments, all tiles in a picture may be processed by a single core.

Referring to FIG. 10, each of the plurality of pictures 640, 642, 644, 646 may include two tiles TILE1-1 and TILE1-2, TILE2-1 and TILE2-2, TILE3-1 and TILE3-2, and TILE4-1 and TILE4-2, respectively. Each of tiles TILE1-1 and TILE1-2, TILE2-1 and TILE2-2, TILE3-1 and TILE3-2, and TILE4-1 and TILE4-2 may include one or more blocks. Each of the plurality of pictures 640, 642, 644, 646 may include a first processing unit TILE1-1, TILE2-1, TILE3-1 and TILE4-1, and a second processing unit TILE1-2, TILE2-

2, TILE3-2 and TILE4-2. That is, for example, a first processing unit of picture 640 includes TILE1-1, and a second processing unit of picture 640 includes TILE1-2. Here, each of the plurality of pictures 640, 642, 644, 646 may be a frame to encode, an original picture, a raw bitstream of a picture to encode, a frame to decode, an encoded picture, or an encoded bitstream EB received through the receiver interface 270, etc.

Operations of the first core CORE0 and the second core CORE1 will be described in reference to FIGS. 1, 2, 10 and 11.

In a first time period T31, the first core CORE0 may process the first tile TILE1-1 of the first picture 640. For parallel processing, a tile delay may be assigned to the second core CORE1.

In a second time period T32, the first core CORE0 may process the second tile TILE1-2 of the first picture 640 and the second core CORE1 may process the first tile TILE2-1 of the second picture 642. The processing of the first tile TILE2-1 and the second tile TILE1-2 may be performed in parallel in the second time period T2. As in the case discussed above, here, "parallel" denotes that there is some overlap in the processing of the first tile TILE2-1 and the second tile TILE1-2. That is, while dotted lines are used in FIGS. 4, 6, 8, 11, 14, these lines are only provided for ease of description and are not intended to suggest that the start times or the end times for processing exactly coincide. For example, the dotted lines in FIG. 11 are not intended to suggest that the start times or the end times for processing the first tile TILE2-1 and the second tile TILE2-1 exactly coincide. However, in some exemplary embodiments, the start times may exactly coincide and/or the end times may exactly coincide.

In addition, in the second time period T32, the first core CORE0 may perform in-loop filtering on a boundary of the tiles TILE1-1 and TILE1-2 for each block based on a processing result of the first tile TILE1-1 in the first picture 640. That is, in the second time period T32, the first CORE0 may perform processing of the second tile TILE1-2 and in-loop filtering of the tiles TILE1-1 and TILE1-2 so that no additional time is used for in-loop filtering.

In a third time period T33, the first core CORE0 may process the first tile TILE3-1 of the third picture 644 and the second core CORE1 may process the second tile TILE2-2 of the second picture 642. The processing of the first tile TILE3-1 and the second slice TILE2-2 may be performed in parallel in the third time period T33.

In addition, in the third time period T33, the second core CORE1 may perform in-loop filtering on a boundary of the tiles TILE2-1 and TILE2-2 for each block based on a processing result of the first tile TILE2-1 in the second picture 642. That is, in the third time period T33, the second CORE1 may perform processing of the second tile TILE2-2 and in-loop filtering of the tiles TILE2-1 and TILE2-2 so that no additional time is used for in-loop filtering.

In a fourth time period T34, each core of the cores CORE0, and CORE1 may continue to process respective tiles in a similar way as in the operation in the third time period T33.

Figure 12:
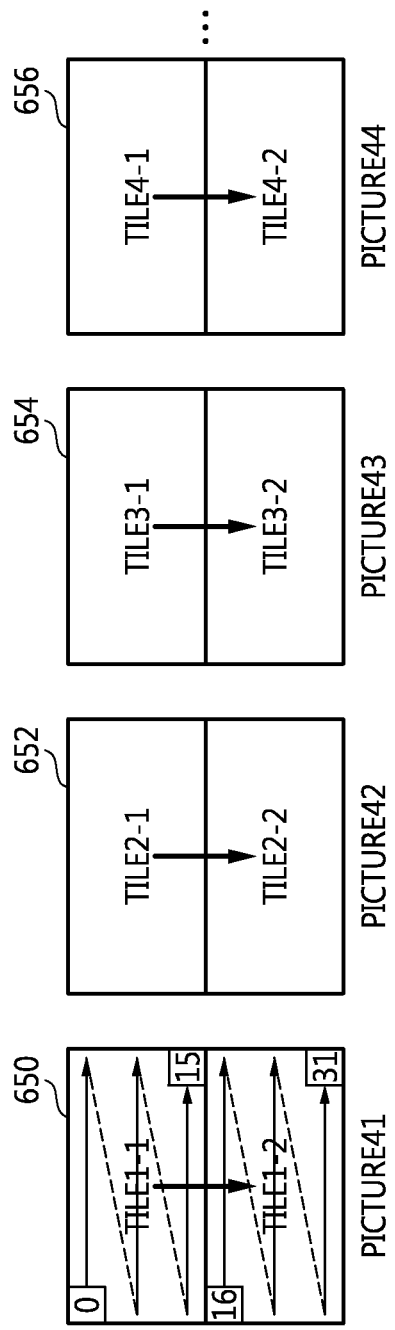
FIG. 12 is a conceptual diagram illustrating a sequence of pictures each of which include two tiles respectively.

FIG. 12 is a conceptual diagram illustrating a sequence of pictures each of which includes two tiles partitioned using horizontal partitioning respectively.

An arrow shown in each of a plurality of pictures 650, 652, 654 and 656 illustrates a processing direction or a processing order of a plurality of tiles in the plurality of pictures 650, 652, 654 and 656.

The controller 200A in FIG. 1 may include two hardware codecs 230-1 and 230-2. A first core CORE0 may be a first hardware codec 230-1 and a second core CORE1 may be a second hardware codec 230-2. Operations of the first core CORE0 and the second core CORE1 will be described in reference to FIGS. 1, 2, 11 and 12.

Referring to FIG. 12, each of the plurality of pictures 650, 652, 654, 656 such as PICTURE41, PICTURE42, PICTURE43 and PICTURE44 may include two tiles TILE1-1 and TILE1-2, TILE2-1 and TILE2-2, TILE3-1 and TILE3-2, and TILE4-1 and TILE4-2, respectively. Each of the tiles TILE1-1 and TILE1-2, TILE2-1 and TILE2-2, TILE3-1 and TILE3-2, and TILE4-1 and TILE4-2 may include one or more blocks. Each of the plurality of pictures 650, 652, 654, 656 may include a first processing unit TILE1-1, TILE2-1, TILE3-1 and TILE4-1, respectively, and a second processing unit TILE2-1, TILE2-2, TILE3-2 and TILE4-2, respectively. Here, each of the plurality of pictures 650, 652, 654, 656 may be a frame to encode, an original picture, a raw bitstream of a picture to encode, a frame to decode, an encoded picture, or an encoded bitstream EB received through the receiver interface 270, etc.

In a first time period T31, the first core CORE0 may process the first tile TILE1-1 of the first picture 650. For parallel processing, a tile delay may be assigned to the second core CORE1.

In a second time period T32, the first core CORE0 may process the second tile TILE1-2 of the first picture 650 and the second core CORE1 may process the first tile TILE2-1 of the second picture 652. The processing of the first tile TILE2-1 and the second tile TILE1-2 may be performed in parallel in the second time period T32.

In addition, in the second time period T32, the first core CORE0 may perform in-loop filtering on a boundary of the tiles TILE1-1 and TILE1-2 for each block based on a processing result of the first tile TILE1-1 in the first picture 650. That is, in the second time period T32, the first CORE0 may perform a processing of the second tile TILE1-2 and in-loop filtering of the tiles TILE1-1 and TILE1-2 so that no additional time is used for in-loop filtering.

In a third time period T33, the first core CORE0 may process the first tile TILE3-1 of the third picture 654 and the second core CORE1 may process the second tile TILE2-2 of the second picture 652. The processing of the first tile TILE3-1 and the second slice TILE2-2 may be performed in parallel in the third time period T33.

In addition, in the third time period T33, the second core CORE1 may perform in-loop filtering on a boundary of the tiles TILES2-1 and TILE2-2 for each block based on a processing result of the first tile TILE2-1 in the second picture 652. That is, in the third time period T33, the second CORE1 may perform a processing of the second tile TILE2-2 and in-loop filtering of the tiles TILE2-1 and TILE2-2 so that no additional time is used for in-loop filtering.

In a fourth time period T34, each core of the cores CORE0, and CORE1 may continue to process respective tiles in a similar way as in the operation in the third time period T33.

Figure 13:
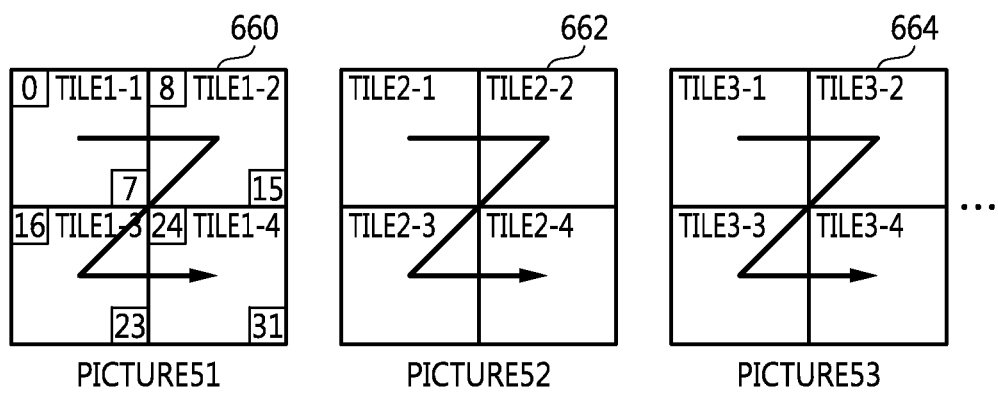
FIG. 13 is a conceptual diagram illustrating a sequence of pictures each of which include four tiles respectively.
Figure 14:
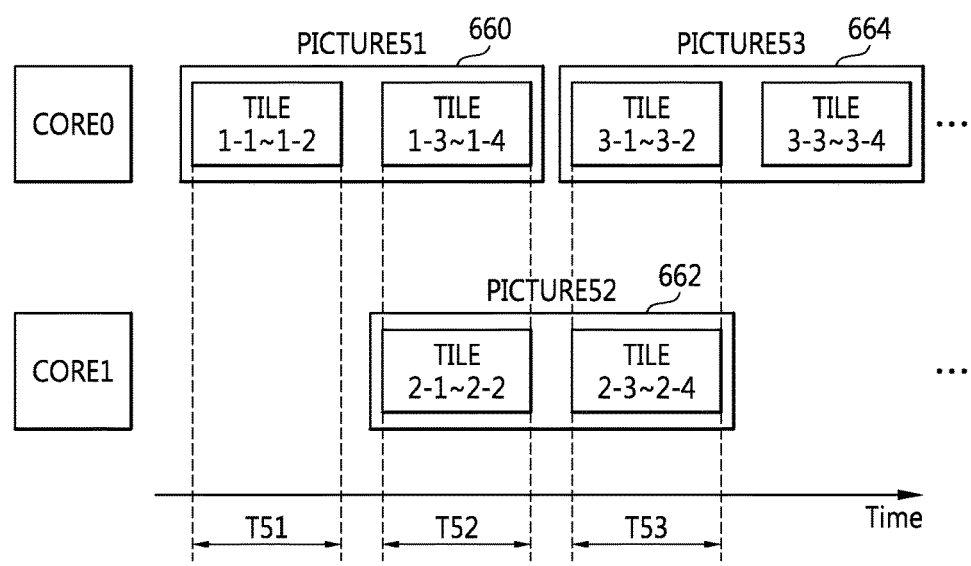
FIG. 14 a conceptual diagram illustrating a procedure to process the sequence of pictures shown in FIG. 13 by two cores.

FIG. 13 is a conceptual diagram illustrating a sequence of pictures each of which include four tiles respectively having both horizontal and vertical partitions. FIG. 14 a conceptual diagram illustrating a procedure to process the sequence of pictures shown in FIG. 13 by two cores.

An arrow shown in each of a plurality of pictures 660, 662, and 664 such as PICTURE51, PICTURE52 and PIC- TURE53 illustrates a processing direction or a processing order of a plurality of tiles in the plurality of pictures 660, 662, and 664.

The controller 200A in FIG. 1 may include two hardware codecs 230-1 and 230-2. A first core CORE0 may be a first hardware codec 230-1 and a second core CORE1 may be a second hardware codec 230-2. In some exemplary embodiments, all tiles in a picture may be processed by a single core. Operations of the first core CORE0 and the second core CORE1 will be described in reference to FIGS. 1, 2, 13 and 14.

Referring to FIG. 13, each of the plurality of pictures 660, 662, and 664 may include four tiles TILE1-1 to TILE1-4, TILE2-1 to TILE2-4, and TILE3-1 to TILE3-4, respectively. Each of the tiles TILE1-1 to TILE1-4, TILE2-1 to TILE2-4, and TILE3-1 to TILE3-4, may include one or more blocks. Each of the plurality of pictures 660, 662, and 664 may include a first processing unit having two tiles TILE1-1 and TILE1-2, TILE2-1 and TILE2-2, and TILE3-1 and TILE3-2, respectively, and a second processing unit having two tiles TILE1-3 and TILE1-4, TILE2-3 and TILE2-4, and TILE3-3 and TILE3-4, respectively. Here, each of the plurality of pictures 660, 662, and 664 may be a frame to encode, an original picture, a raw bitstream of a picture to encode, a frame to decode, an encoded picture, or an encoded bitstream EB received through the receiver interface 270, etc.

In a first time period T51, the first core CORE0 may process the first tile TILE1-1 and the second tile TILE1-2 of the first picture 660 and perform in-loop filtering on a boundary of the tiles TILE1-1 and TILE1-2 of the first picture 660 for each block based on a processing result of the first tile TILE1-1. For parallel processing, two tile delays may be assigned to the second core CORE1.

In a second time period T52, the first core CORE0 may process the third tile TILE1-3 and fourth tile TILE1-4 of the first picture 660, and the second core CORE1 may process the first tile TILE2-1 and the second tile TILE2-2 of the second picture 662. The processing of the third tile TILE1-3 and fourth tile TILE1-4 and the processing of the first tile TILE2-1 and the second tile TILE2-2 may be performed in parallel in the second time period T52. As in the case discussed above, here, "parallel" denotes that there is some overlap in the processing of the tiles. That is, while dotted lines are used in FIGS. 4, 6, 8, 11, 14, these lines are only provided for ease of description and are not intended to suggest that the start times or the end times for processing exactly coincide. However, in some exemplary embodiments, the start times may exactly coincide and/or the end times may exactly coincide.

In addition, in the second time period T52, the first core CORE0 may perform in-loop filtering on a boundary of the tiles TILE1-1 and TILE1-3 for each block based on a processing result of the first tile TILE1-1 in the first picture 660.

In the second time period T52, the first core CORE0 may perform in-loop filtering on a boundary of the tiles TILE1-2 and TILE1-4 for each block based on a processing result of the second tile TILE1-2 in the first picture 660.

In the second time period T52, the first core COREO may perform in-loop filtering on a boundary of the tiles TILE1-3 and TILE1-4 for each block based on a processing result of the third tile TILE1-3 in the first picture 660.

In a second time period T52, the second core CORE1 may perform in-loop filtering on a boundary of the tiles TILE2-1 and TILE2-2 of the second picture 662 for each block based on a processing result of the first tile TILE2-1 in the second picture 662.

That is, the in-loop filtering on the boundaries of the processed tiles are performed in the second time period T52 so that no additional time is used for in-loop filtering.

In a third time period T53, the cores CORE0, and CORE1 may continue to process respective tiles in a similar way as in the operation in the second time period T52.

Figure 15:
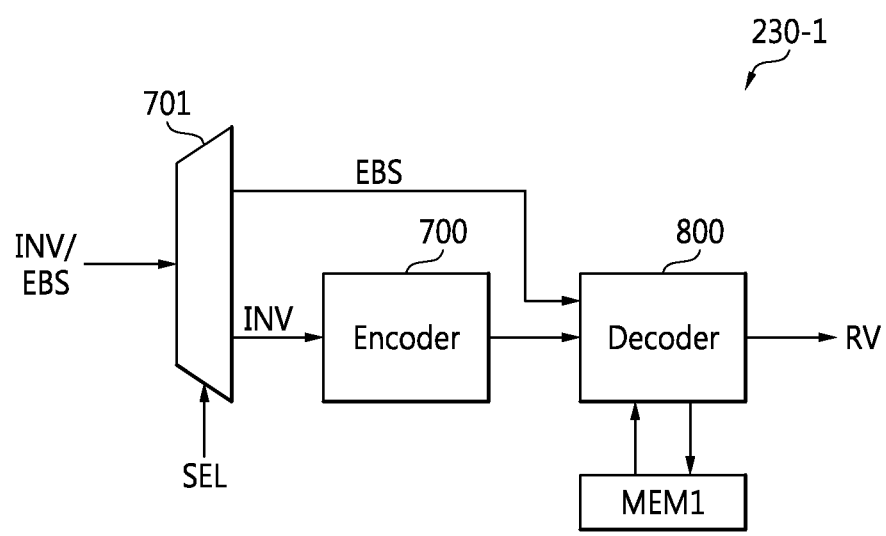
FIG. 15 is a block diagram illustrating a hardware codec of the data processing system shown in FIG. 1.

FIG. 15 is a block diagram illustrating a hardware codec shown in FIG. 1.

Referring to FIGS. 1 and 15, the hardware codec 230-1 may include a selection circuit 701, an encoder 700, a decoder 800 and a memory MEM1.

The selection circuit 701 may output image data or video data INV to the encoder 700 in response to a selection signal SEL when the selection signal SEL has a first level, e.g., a low level. The selection circuit 701 may output an encoded bitstream EBS to the decoder 800 in response to a selection signal SEL when the selection signal SEL has a second level, e.g., a high level.

The selection signal SEL may be provided by the CPU 210A. The image data or the video data INV may be provided through the camera interface 250 and the encoded bitstream EBS may be provided through the receiver interface 270 or the memory interface 240.

The encoder 700 may encode the output image data or the output video data INV from the selection circuit 701 and output the encoded image data or the encoded video data to the decoder 800 by an encoded bitstream.

The decoder 800 may decode the encoded bitstream EBS output from the selection circuit 701 or the encoded bitstream output from the encoder 700, and generate a reconstructed image data or a reconstructed video data RV. The reconstructed image data or a reconstructed video data RV may be displayed on the display 40 through the display interface 260.

In some exemplary embodiments, the encoder 700 or decoder 800 may store the reconstructed image data or the reconstructed video data RV in the memory MEM1. The encoder 700 or decoder 800 may perform in-loop filtering of the stored reconstructed image data or the stored reconstructed video data in the memory MEM1.

In some exemplary embodiments, each of the encoder 700 and the decoder 800 may include in-loop filtering that is defined according to H.264 video coding standard or HEVC video coding standard or any other standard supporting in-loop de-blocking filter.

Figure 16:
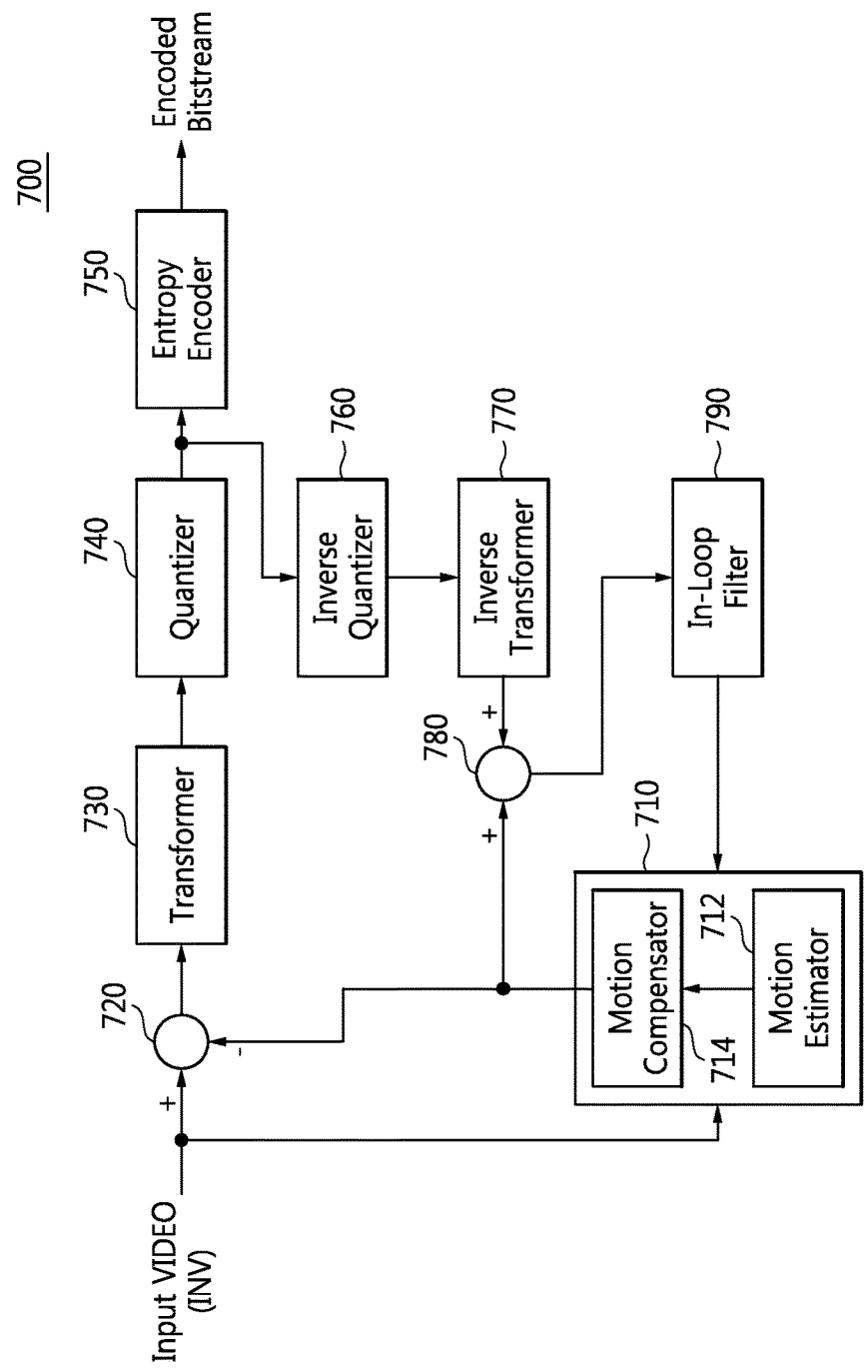
FIG. 16 is a block diagram of an encoder of the hardware codec shown in FIG. 15.

FIG. 16 is a block diagram of an encoder shown in FIG. 15.

Referring to FIGS. 15 and 16, the encoder 700 may include a predictor 710, a subtractor 720, a transformer 730, a quantizer 740, an entropy encoder 750, an inverse quantizer 760, an inverse transformer 770, an adder 780 and an in-loop filter 790.

The predictor 710 may include a motion estimator 712 and a motion compensator 714. The predictor 710 may predict a current block, generate a predicted block and output the predicted block. In particular, the predictor 710 may predict a pixel value of each of pixels in the current block and generate a predicted block including the predicted pixel value of each of the pixels. When an inter prediction is performed, the predictor 710 may include the motion estimator 712 and the motion compensator 714. The motion estimator 712 may be called a motion vector estimator.

The motion estimator 712 or motion vector estimator 712 may estimate a motion vector of a current block based on at least one reference picture by a block corresponding to a block mode or a predefined block mode of the current block, and determine the motion vector of the current block. A size of the block may be 16×16, 16×8, 8×16, 8×8, 8×4, 4×8 or 4×4.

The motion compensator 714 may generate a predicted block based on the motion estimation vector of the current block output from the motion estimator 712, and output the predicted block. That is, the motion compensator 714 may output a block in the reference picture addressed by the current block as a predicted block.

The subtractor 720 may subtract the predicted block from the current block having video data INV, and generate a residual block. The subtractor 720 may calculate a difference between each of pixels of the current block and each of pixels of the predicted block, and generate the residual block including residual signals.

The transformer 730 may transform the residual signals from time domain to frequency domain, and the quantizer 740 may quantize an output of the transformer 730 and output the quantized residual block. The transformer 730 may use a discrete cosine transform DCT for transforming the residual signals to frequency domain. The residual signals transformed to frequency domain may be a transform coefficient.

The entropy encoder 750 may encode the quantized residual block output from the quantizer 740 and output an encoded bitstream. Also, the inverse quantizer 760 may inverse quantize the quantized residual block output from the quantizer 740 and output an inverse quantized residual block.

The inverse transformer 770 may perform an inverse transform of inverse quantized residual block, and generate a reconstructed residual block.

The adder 780 may add the predicted block from the predictor 710 and the reconstructed residual block output from the inverse transformer 770, and reconstruct the current block.

The in-loop filter 790 may perform in-loop filtering of the reconstructed current block, and output the filtered current block to the predictor 710.

Figure 17:
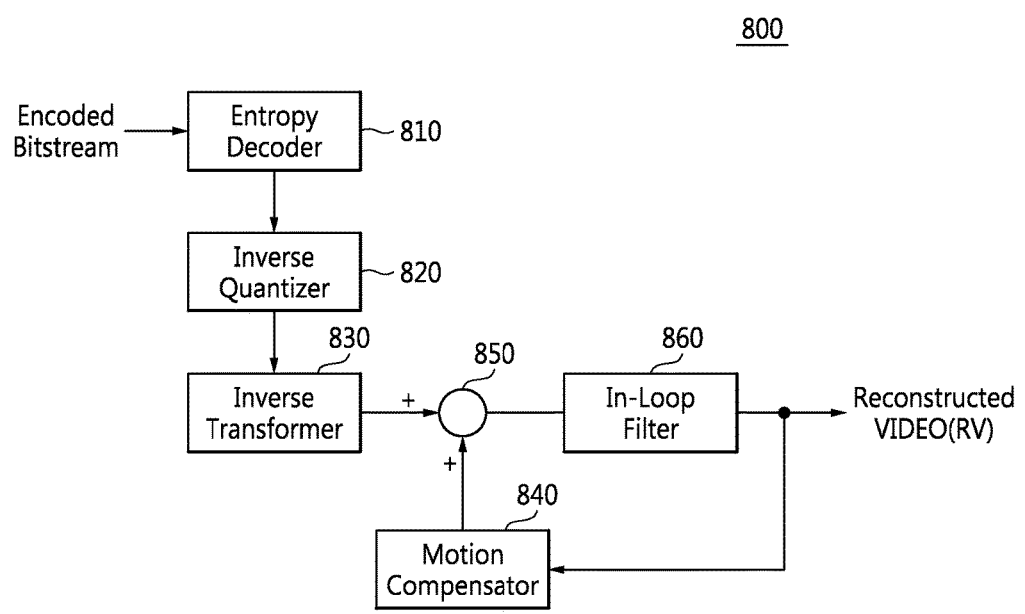
FIG. 17 is a block diagram of a decoder of the hardware codec shown in FIG. 15.

FIG. 17 is a block diagram of a decoder shown in FIG. 15.

Referring to FIGS. 15 to 17, the decoder 800 may include an entropy decoder 810, an inverse quantizer 820, an inverse transformer 830, a motion compensator 840, an adder 850 and an in-loop filter 860.

The entropy decoder 810 may decode a received encoded bitstream EBS or an encoded bitstream output from the encoder 700, and generate a quantized residual block.

The inverse quantizer 820 may perform an inverse quantization of the quantized residual block output from the entropy decoder 810, and generate an inverse quantized residual block.

The inverse transform 830 may perform an inverse transform of the inverse quantized residual block, and generate a reconstructed residual block.

The motion compensator 840 may predict a current block based on a motion vector included in the reconstructed block output from the in-loop filter 860, and output the predicted block.

The adder 850 may reconstruct the current block by adding the reconstructed residual block output from the inverse transformer 830 and the predicted block output from the motion compensator 840, and output the reconstructed current block.

The in-loop filter 860 may perform an in-loop filtering of the reconstructed current block, and output the reconstructed current block RV. That is, the in-loop filter 860 may output the reconstructed video data RV by a block.

In some exemplary embodiments, the in-loop filters 790 and 860 may each include a de-blocking filter and a sample adaptive offset (SAO) filter.

Figure 18:
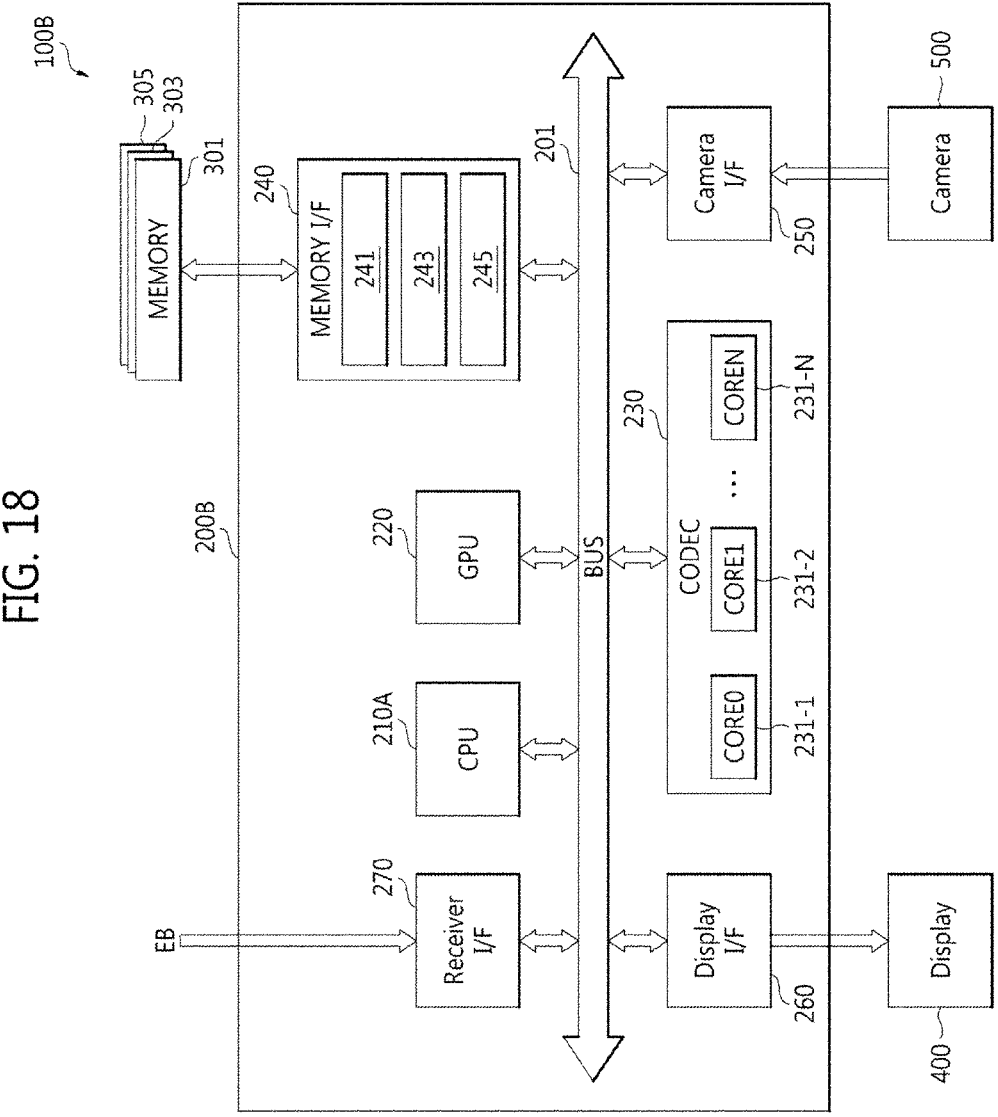
FIG. 18 is a block diagram illustrating a data processing system according to an exemplary embodiment.

FIG. 18 is a block diagram illustrating a data processing system according to an exemplary embodiment.

Referring to FIG. 18, a data processing system 100B may include a controller 200B, a plurality of memories 301, 303, 305, and a display 400. In some exemplary embodiments, the data processing system 100B may further include a camera 500.

The controller 200B may be embodied in an integrated circuit (IC), a system-on-chip (SoC), an application processor (AP), and/or a mobile AP, etc.

The controller 200B may include a CPU 210A, a GPU 220, a plurality of hardware codec 230, a memory interface (I/F) 240, a display interface (I/F) 260 and a receiver interface (I/F) 270. When the data processing system 100B further includes a camera 500, the controller 200B may further include a camera interface (IF) 250.

The controller 200B shown in FIG. 18 is equal to or similar to the controller 200A shown in FIG. 1 in view of structure and operation except for the plurality of codecs 231-1 to 231-N included in a hardware codec.

Operations of each of the plurality of codecs 231-1 to 231-N may be equal to or similar to the operations of each of the plurality of hardware codecs 230-1 to 230-N in FIG. 1. In addition, each of the plurality of codecs 231-1 to 231-N may have a memory corresponding to each of the memories MEM1 to MEMN.

Each of the plurality of codecs 231-1 to 231-N may include the components 701, 700 and 800 that are described with reference to FIGS. 15 to 17. The first core CORE0, the second CORE1 and the third core CORE2 described in FIG. 4 to FIG. 14 may correspond to a first core 231-1, a second core 231-2, and a third core 231-3, respectively.

Figure 19:
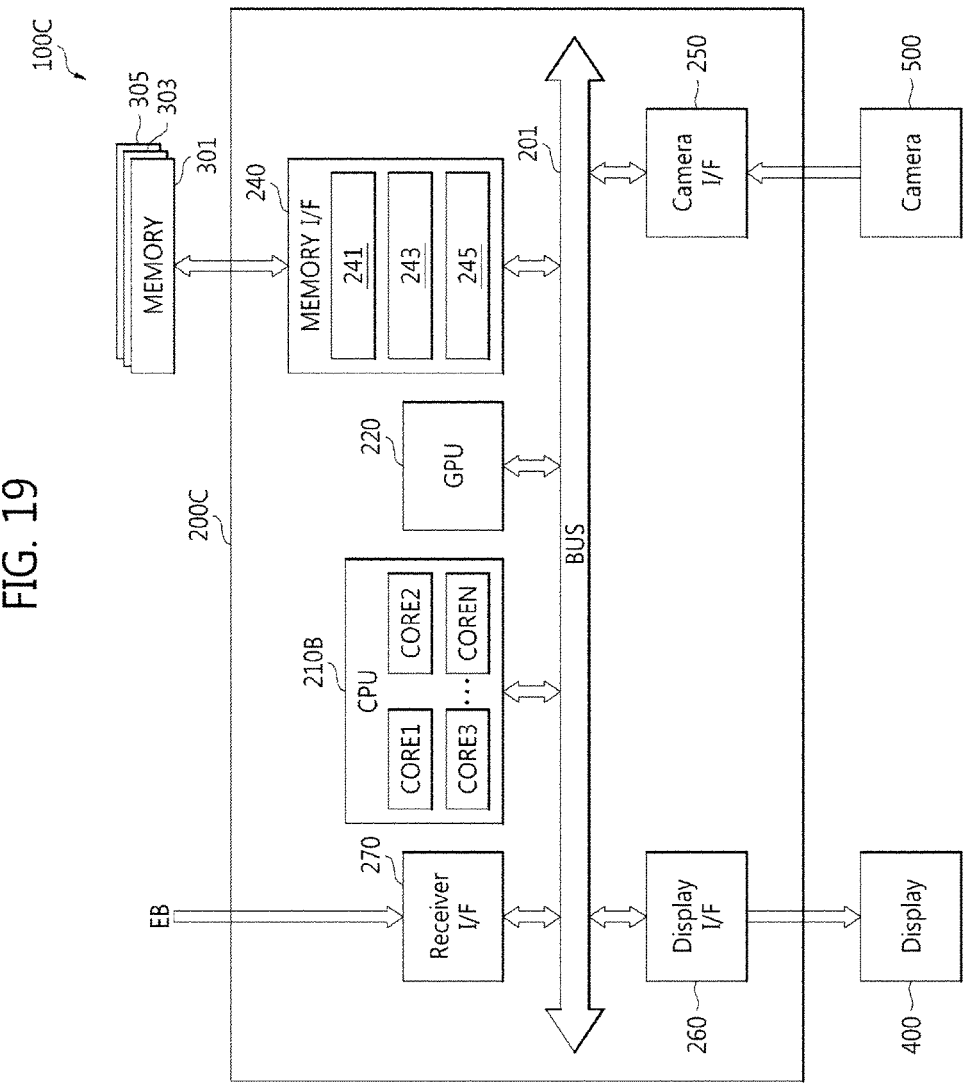
FIG. 19 is a block diagram illustrating a data processing system according to an exemplary embodiment.

FIG. 19 is a block diagram illustrating a data processing system according to an exemplary embodiment.

Referring to FIG. 19, a data processing system 100C may include a controller 200C, a plurality of memories 301, 303, 305, and a display 400. In some exemplary embodiments, the data processing system 100C may further include a camera 500.

The controller 200C may be embodied in an integrated circuit (IC), a system-on-chip (SoC), an application processor (AP), and/or a mobile AP, etc.

The controller 200C may include a CPU 210B, a GPU 220, a memory interface (I/F) 240, a display interface (I/F) 260 and a receiver interface (I/F) 270. When the data processing system 100C further includes a camera 500, the controller 200C may further include a camera interface (I/F) 250.

The controller 200C shown in FIG. 19 is equal to or similar to the controller 200A shown in FIG. 1 in view of structure and operation except that the CPU 210B includes a plurality of cores CORE1 to COREN.

Operations of each of the plurality of cores CORE1 to COREN may be equal to or similar to the operations of each of the plurality of hardware codecs 230-1 to 230-N in FIG. 1. In addition, each of the plurality of cores CORE1 to COREN may have a memory (e.g., a cache) corresponding to each of the memories MEM1 to MEMN.

Each of the plurality of cores CORE1 to COREN may execute a software codec. The first core CORE0, the second CORE1 and the third core CORE2 described in FIG. 4 to FIG. 14 may correspond to a first core CORE1, a second core CORE2, and a third core CORE2 in FIG. 19, respectively when N is 3.

The software codec executed by each of the cores CORE1 to COREN may perform encoding, decoding, encoding including in-loop filtering, or decoding including in-loop filtering with reference to FIGS. 4 to 14.

Figure 20:
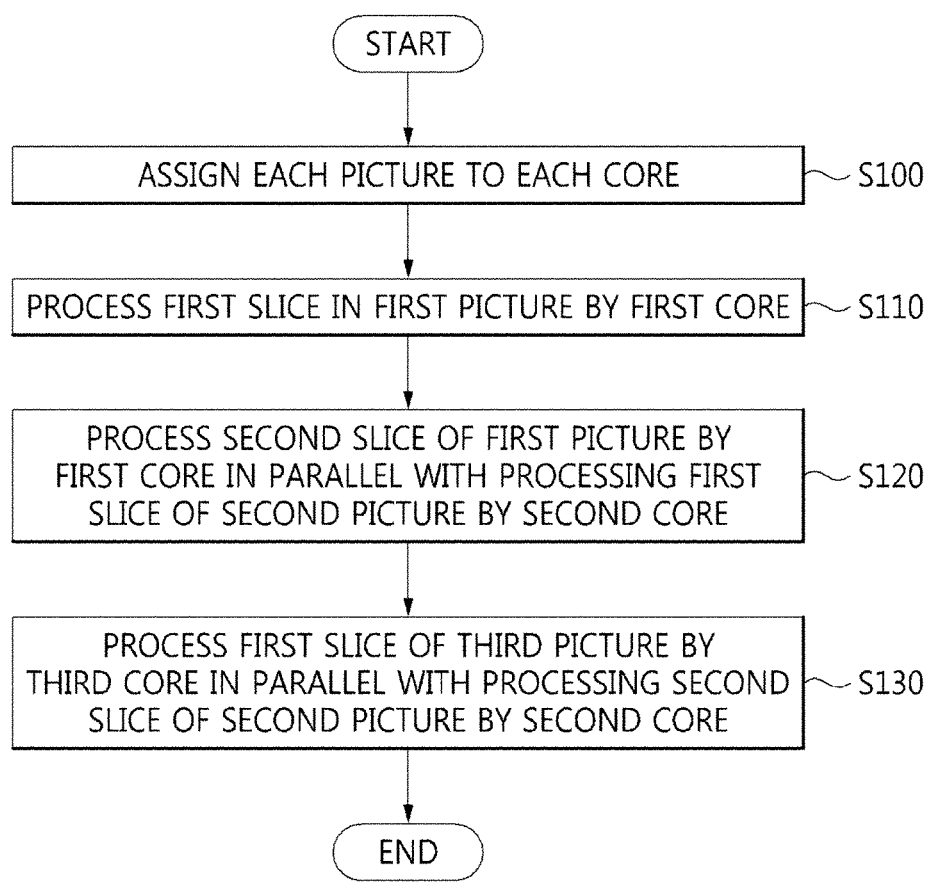
FIG. 20 is a flow chart illustrating a method of processing video data by the data processing systems shown in FIGS. 1, 18, and 19, according to an exemplary embodiment.

FIG. 20 is a flow chart illustrating a method of processing video data by the data processing system shown in FIGS. 1, 18, and 19, according to an exemplary embodiment. The method of processing may be, for example, encoding or decoding.

Referring to FIGS. 1 to 20, in operation S100, each picture is assigned to a core. For example, each of a first picture, a second picture and a third picture in video data may be assigned to one of a first core and a second core for processing the video data. Each of the first picture, the second picture and the third picture may include a first slice (or a first tile) and a second slice (or a second tile) respectively.

In operation S110, a first slice (or a first tile) in the first picture may be processed by the first core. In operation S120, a first slice (or a first tile) in the second picture may be processed by the second core in parallel while a second slice (or a second tile) of the first picture is processed by the first core. In operation S120, the first core may further perform in-loop filtering of the first slice and the second slice of the first picture based on the processing result of the first slice of the first picture. In operation S130, a first slice (or a first tile) in the third picture may be processed by the third core in parallel while a second slice (or a second tile) of the second picture is processed by the second core. In operation S130, the second core may further perform in-loop filtering of the first slice and the second slice of the second picture based on the processing result of the first slice of the second picture.

As described above, the method of decoding video data described in FIGS. 1 to 14, and 18 to 20, may be used similarly for a method of encoding the video data by assigning each of a plurality of pictures to each of a plurality of cores and processing in parallel the plurality of pictures by the plurality of cores.

Although the present inventive concept has been described with reference to exemplary embodiments thereof, it will be understood by those of ordinary skill in the art that various changes in forms and details may be made thereto without departing from the spirit and scope of the present inventive concept as defined by the following claims.

What is claimed is:

1. An application processor comprising:
 a receiving interface that receives picture data; and
 a central processing unit (CPU) that controls the receiving interface to assign an odd picture of the picture data to a first core, and an even picture of the picture data to a second core,
 wherein the first core divides the odd picture into a first processing unit and a second processing unit based on a first complexity of the odd picture, and processes the first processing unit and the second processing unit and performs in-loop filtering on a boundary of the first processing unit and the second processing unit for each of a plurality of blocks based on a result of processing the first processing unit; and
 the second core divides the even picture into a third processing unit and a fourth processing unit based on a second complexity of the even picture, and processes the third processing unit in parallel with the second processing unit being processed by the first core, and the fourth processing unit and performs in-loop filtering on a boundary of the third processing unit and the fourth processing unit for each of a plurality of blocks based on a result of processing the third processing unit,
 the first core and the second core are hardware cores,
 each of the first core and the second core performs the in-loop filtering of a current processed block using at least one of an upper processed block and a left processed block adjacent to the current processed block, and
 when the current processed block is being processed, the CPU determines a motion vector for the current processed block to avoid dependency on processing units being currently parallel processed by making the current processed block refer to a processing unit for which processing has already been completed.

2. The application processor of claim 1, wherein
 when a first number of slices in the second processing unit is different from a second number of slices in the third processing unit, the first core is configured to complete the processing of the second processing unit in a first time period and the second core is configured to complete the processing of the third processing unit in the first time period.

3. The application processor of claim 1,
 when a first number of tiles in the second processing unit are different from a second number of tiles in the third processing unit, the first core is configured to complete the processing of the second processing unit in a first time period and the second core is configured to complete the processing of the third processing unit in the first time period.

4. The application processor of claim 1, wherein the first core comprises an in-loop filter that conforms to an H.264 video coding standard, and
 wherein the second core is configured to process the third processing unit while the first core processes the second processing unit and performs the in-loop filtering of a processed block in the second processing unit using the in-loop filter.

5. The application processor of claim 1, wherein the first core comprises an in-loop filter that conforms to a High Efficiency Video Coding (HEVC) standard, and
 wherein the second core is configured to process the third processing unit while the first core processes the second processing unit and performs the in-loop filtering of a processed block in the second processing unit using the in-loop filter.

6. The application processor of claim 1, wherein each of the first processing unit, the second processing unit, the third processing unit, and the fourth processing unit includes at least one slice.

7. The application processor of claim 1, wherein each of the first processing unit, the second processing unit, the third processing unit, and the fourth processing unit includes at least one tile.

8. The application processor of claim 1, wherein the first core is embodied in a first hardware codec and the second core is embodied in a second hardware codec.

9. The application processor of claim 1, wherein the second core is configured to perform the processing of the third processing unit after a delay of a processing time from processing of the first processing unit by the first core.

10. The application processor of claim 1, wherein a first portion of a first processing time of the processing of the second processing unit overlaps with a second portion of a second processing time of the processing of the third processing unit.

11. A system-on-chip comprising:
a receiver interface configured to receive a first picture and a second picture different from the first picture; and
a central processing unit (CPU) that controls the receiver interface to assign the first picture a first core, and the second picture to a second core,
wherein the first core divides the first picture into a first processing unit and a second processing unit based on a first complexity of the first picture, and processes the first processing unit and the second processing unit and performs in-loop filtering on a boundary of the first processing unit and the second processing unit for each of a plurality of blocks based on a result of processing the first processing unit,
the second core divides the second picture into a third processing unit and a fourth processing unit based on a second complexity of the second picture, and processes the third processing unit in parallel with the second processing unit being processed by the first core, and the fourth processing unit and performs in-loop filtering on a boundary of the third processing unit and the fourth processing unit for each of a plurality of blocks based on a result of processing the third processing unit,
the first core and the second core are hardware cores,
each of the first core and the second core performs the in-loop filtering of a current processed block using at least one of an upper processed block and a left processed block adjacent to the current processed block, and
when the current processed block is being processed, the CPU determines a motion vector for the current processed block to avoid dependency on processing units being currently parallel processed by making the current processed block refer to a processing unit for which processing has already been completed.

12. The system-on-chip of claim 11, wherein when a first number of slices in the second processing unit is different from a second number of slices in the third processing unit, the first core is configured to complete the processing of the second processing unit in a first time period and the second core is configured to complete the processing of the third processing unit in the first time period.

13. The system-on-chip of claim 11, wherein when a first number of tiles in the second processing unit are different from a second number of tiles in the third processing unit, the first core is configured to complete the processing of the second processing unit in a first time period and the second core is configured to complete the processing of the third processing unit in the first time period.

14. The system-on-chip of claim 11, wherein the first core comprises an in-loop filter that conforms to an H.264 video coding standard, and
wherein the second core is configured to process the third processing unit while the first core processes the second processing unit and performs the in-loop filtering of a processed block in the second processing unit using the in-loop filter.

15. The system-on-chip of claim 11, wherein the first core includes an in-loop filter that conforms to a High Efficient Video Coding (HEVC) standard, and
wherein the second core is configured to process the third processing unit while the first core processes the second processing unit and performs the in-loop filtering of a processed block in the second processing unit using the in-loop filter.

16. A method for processing video data comprising:
assigning a first picture of the video data to a first core and a second picture of the video data to a second core, the second picture being different from the first picture;
receiving, by the first core, the first picture assigned to the first core, dividing, by the first core, the first picture into a first processing unit and a second processing unit based on a first complexity of the first picture, processing, by the first core, the first processing unit and the second processing unit and performing in-loop filtering on a boundary of the first processing unit and the second processing unit for each of a plurality of blocks based on a result of processing the first processing unit;
receiving, by the second core, the second picture assigned to the second core, dividing, by the second core, the second picture into a third processing unit and a fourth processing unit based on a second complexity of the second picture, processing, by the second core, the third processing unit in parallel with the second processing unit being processed by the first core, and the fourth processing unit and performing in-loop filtering on a boundary of the third processing unit and the fourth processing unit for each of a plurality of blocks based on a result of processing the third processing unit,
wherein the first core and the second core are hardware cores,
each of the first core and the second core performs the in-loop filtering of a current processed block using at least one of an upper processed block and a left processed block adjacent to the current processed block, and
when the current processed block is being processed, a motion vector for the current processed block is determined to avoid dependency on processing units being currently parallel processed by making the current processed block refer to a processing unit for which processing has already been completed.

17. The method of claim 16, wherein each of the first processing unit, the second processing unit, and the third processing unit include at least one slice or tile.

18. The method of claim 17, wherein the video data comprises odd pictures and even pictures, all the odd pictures of the video data are assigned to the first core, and all the even pictures of the video data are assigned to the second core until processing of the video data is completed.

19. The method of claim 16, further comprising:
assigning a third picture of the video data to a third core; and
processing a fifth processing unit of the third picture by the third core in parallel with the processing the third processing unit of the second picture by the second core.

20. The application processor of claim 1, wherein the first core is a first core of a central processing unit (CPU) and the second core is a second core of the CPU.

21. The application processor of claim 1, wherein the CPU generates and stores in a memory, a motion constraint slice group including information to restrict a reference picture or reference processing unit of a previous picture which is referred to by a processing unit being currently processed, and
the motion vector is determined to avoid the dependency based on the motion constraint slice group stored in the memory.

* * * * *